(12) United States Patent
Kimura

(10) Patent No.: US 7,668,368 B2
(45) Date of Patent: Feb. 23, 2010

(54) IMAGE PROCESSING APPARATUS, CAMERA APPARATUS, IMAGE OUTPUT APPARATUS, IMAGE PROCESSING METHOD, COLOR CORRECTION PROCESSING PROGRAM AND COMPUTER READABLE RECORDING MEDIUM

(75) Inventor: Katsuji Kimura, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 742 days.

(21) Appl. No.: 11/317,452

(22) Filed: Dec. 22, 2005

(65) Prior Publication Data

US 2006/0139707 A1 Jun. 29, 2006

(30) Foreign Application Priority Data

Dec. 24, 2004 (JP) ............................. 2004-373526
Apr. 6, 2005 (JP) ............................. 2005-110389

(51) Int. Cl.
*G06K 9/00* (2006.01)
(52) U.S. Cl. ...................................... 382/167; 358/518
(58) Field of Classification Search ................. 382/167; 358/518
See application file for complete search history.

(56) References Cited

U.S. PATENT DOCUMENTS

| 4,623,973 | A | * | 11/1986 | Hoffrichter et al. .......... 382/167 |
| 5,130,935 | A | | 7/1992 | Takiguchi |
| 5,384,601 | A | * | 1/1995 | Yamashita et al. .......... 348/577 |
| 2001/0035989 | A1 | | 11/2001 | Takemoto |
| 2002/0126302 | A1 | * | 9/2002 | Fukao ........................ 358/1.9 |
| 2004/0156544 | A1 | | 8/2004 | Kajihara |
| 2004/0218075 | A1 | | 11/2004 | Tsuruoka |

FOREIGN PATENT DOCUMENTS

| JP | 09-214792 | 8/1997 |
| JP | 2002-185973 | 6/2002 |
| JP | 2002-223366 | 8/2002 |
| JP | 2004-112694 | 4/2004 |
| JP | 2004-297438 | 10/2004 |

* cited by examiner

*Primary Examiner*—Vikkram Bali
*Assistant Examiner*—Eueng-Nan Yeh
(74) *Attorney, Agent, or Firm*—Edwards Angell Palmer & Dodge LLP; David G. Conlin; William J. Daley, Jr.

(57) ABSTRACT

A correction processing section 1 performs a color correction such that a movement amount indicating how much input values of image signals should be moved for the purpose of color correction becomes smaller as the distance between the input values and the coordinates of the center of region to be corrected becomes larger in the region to be corrected, based on the input values of the input signals (L signal, *a signal, *b signal), conditional data (such as radius r) defining a local region to be corrected, the coordinates (Lc, *ac, *bc) of the center of the region to be corrected and the coordinates (Lm, *am, *bm) of the center of an ideal color region to be targeted.

33 Claims, 23 Drawing Sheets
(3 of 23 Drawing Sheet(s) Filed in Color)

Distance $l = \sqrt{(x'-xb)^2 + (y'-yb)^2}$

Color space *a, *b

FIG.21

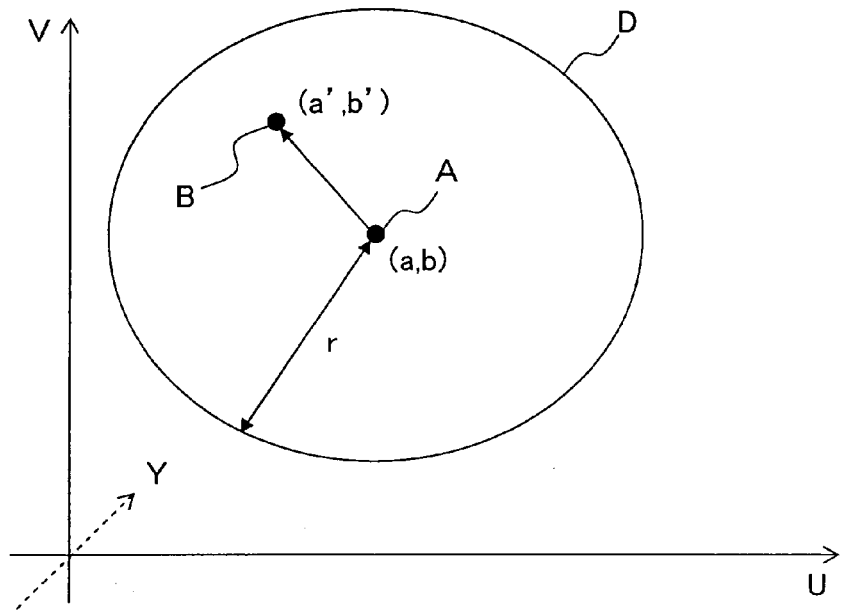

Software algorithm

Condition
(u, v) is located within a circle having a radius r, (a, b) being positioned at a center of the circle, and y is located between y_level_h and y_level_l →Correction is performed
Otherwise, correction is not performed.

$\Delta a' = a' - a$
$\Delta b' = b' - b$

When (u, v) is converted to (u', v'), $u' = u + (1 - DisIn/r) * \Delta a'$
$v' = v + (1 - DisIn/r) * \Delta b'$ DisIn is a distance between (u, v) and (a, b).

FIG.22

Hardware algorithm

1) Calculation of distance (where L represents a distance)
   $L\_U = |B\_Y\_IN - SKIN\_B\_Y\_C|$
   $L\_V = |R\_Y\_IN - SKIN\_R\_Y\_C|$     SKIN_B_Y_C, SKIN_R_Y_C is a value set at a register.

When $L\_U/2 \geq L\_V$         $L = L\_U + L\_V/4$
   When $L\_U \geq L\_V > L\_U/2$   $L = (27/32)*L\_U + (9/16)*L\_V$
   When $2*L\_U \geq L\_V > L\_U$   $L = (9/16)*L\_U + (27/32)*L\_V$
   When $L\_V > 2*L\_U$            $L = L\_U/4 + L\_V$ 2) Calculation of correction amounts Equivalents of $\Delta a'$, $\Delta b'$ are kept at the register.
   SKIN_B_Y_D, SKIN_R_Y_D SKIN_SFT = 256 - L * INV_SKIN_L            INV_SKIN_L is an inverse of SKIN_L
                                              SKIN_L * INV_SKIN_L = 256
   SKIN_SFT_B_Y = B_Y_IN + SKIN_SFT * SKIN_B_Y_D
   SKIN_SFT_R_Y = R_Y_IN + SKIN_SFT * SKIN_R_Y_D 3) Area determination
   if(L < SKIN_L && Y > SKIN_Y_L && Y < SKIN_Y_H)
      B_Y_OUT = SKIN_SFT_B_Y
      R_Y_OUT = SKIN_SFT_R_Y
   else
      B_Y_OUT = B_Y_IN
      R_Y_OUT = R_Y_IN

IMAGE PROCESSING APPARATUS, CAMERA APPARATUS, IMAGE OUTPUT APPARATUS, IMAGE PROCESSING METHOD, COLOR CORRECTION PROCESSING PROGRAM AND COMPUTER READABLE RECORDING MEDIUM

This Nonprovisional application claims priority under 35 U.S.C. §119(a) on Patent Applications No. 2004-373526 filed in Japan on Dec. 24, 2004 and No. 2005-110389 filed in Japan on Apr. 6, 2005, the entire contents of which are hereby incorporated by reference.

BACKGROUND OF THE INVENTION

1. Field of the Invention

The present invention relates to: an image processing apparatus for performing color correction processing on input values of input image signals in a color coordinate system so that a predetermined color region (e.g., skin color region) is shifted to an ideal color region; a camera apparatus using the image processing apparatus; an image output apparatus (e.g., a liquid crystal display (LCD) or a printer) using the image processing apparatus; an image processing method using the image processing apparatus; a color correction processing program for making a computer execute the image processing method; and a computer readable recording medium on which the color correction processing program is recorded. The present invention is useful when images captured by an image capturing apparatus (e.g., a video camera or a digital still camera) are output from an image output apparatus (e.g., a printer or a plotter) or a display apparatus (e.g., a liquid crystal display (LCD) or a cathode ray tube (CRT)).

2. Description of the Related Art

In recent years, apparatuses for capturing, printing or displaying images (e.g., a video camera, a digital still camera, a mobile phone camera, a liquid crystal display (LCD), a printer, etc.) have been widely used. Thus, it is desired that the quality of the captured image and the quality of output image be improved. Also, rather than faithfully reenacting an original image actually captured so as to display an original image in its original form, it is desired that a color correction be performed to obtain an image preferable to a user so as to display and print a vivid image, which is referred herein to as memory color.

The conventional image processing apparatuses use a color correction method for increasing the image quality of images, such as a color correction method for better representing a shade of skin color and a shade of blue which would be observed in the sky as well as a shade of green which would be observed in trees.

Herein, a color correction method with a general conventional linear conversion will be described with reference to FIG. 16.

FIG. 16 is a diagram showing a position of a skin color in a color space.

An image is represented by a one-dimensional space representing a light intensity (which is referred to as luminance) and a two-dimensional space, shown in FIG. 16, representing color. It is common to perform signal processing (color correction) on both of the above mentioned. Herein, as a method used in general, an image signal is separated into a luminance and a color space. The method is described with reference to the (L*a*b) space (herein, L, *a and *b denote luminance, a red color component in the color space and a blue color component in the color space, respectively).

The L, *a, *b are respectively calculated by using the following equations. The (L*a*b) space is a color space and is widely used in general in an image processing apparatus which handles images. The (L*a*b) space is defined by CIFA.

$$L^* = 116(Y/Y_n)^{1/3} - 16$$

$$a^* = 500[(X/X_n)^{1/3} - (Y/Y_n)^{1/3}]$$

$$b^* = 200[(Y/Y_n)^{1/3} - (Z/Z_n)^{1/3}]$$

where, in X, Y, Z, Xn, Yn and Zn, stimulus values of actual light sources are the stimulus values of light.

As shown in FIG. 16, a region A1 represents a region which is the maximum amount of color space viewed by a user. As for a camera, it is desired that an input light signal be processed appropriately so that the size of the preferred region is closer to the size of this region. Also, it is desired that a display (such as an LCD) represent the size of this region.

However, with the conventional techniques, it is difficult to represent the entire region of the maximum amount of region A1 viewed by a user. For example, a region A2 is the maximum amount of color space represented by an apparatus. Thus, the processing is performed within a range of the maximum amount of color space, depending on the performance of an image processing apparatus as indicated by the region A2. A region A3 is a local skin color region in which a skin color in an image captured or an image displayed is represented.

In order to briefly explain the conventional technique, herein, a representation of a skin color will be described as an example. Also, regarding a region of the color space where image processing is performed, description will be mainly centered on a two-dimensional color space which represent a color of the (*a*b) space shown in FIG. 16.

FIG. 17 shows a color space after the skin color region A3 is moved by adding certain values to the current values. FIG. 18 is a diagram showing details of moving the skin color region A3 of FIG. 17 by adding certain values to the current values. FIG. 19 shows a color space after the skin color region A3 is moved by multiplying the current values by an appropriate factor. FIG. 20 is a diagram showing details of moving, by integration, the skin color region A3 of FIG. 19.

When a vivid skin color region B3 which is actually preferably obtained is calculated from the skin color region A3 represented in FIGS. 17 and 18, it is required to alter the color reproduction for the skin color. In order to alter the color reproduction for the skin color, a method in which the entire (*a*b) space is altered as shown by a dashed line in FIG. 17 is generally used. For example, when the skin color space is moved by adding a movement amount Δd as shown in FIG. 18, the skin color region is made to approach the ideal and vivid skin color region B3 by using a skin color correction method. This skin color correction method moves the entire (*a*b) space by using the following equation.

Δd(x) is a movement amount of Δd in the x space.

$$*a = *a + \Delta d(a)$$

$$*b = *b + \Delta d(b)$$

Next, another skin color correction method will be described with reference to FIGS. 19 and 20.

As another skin color correction method, a method is used in which the skin color region is made to approach the ideal skin color region by integrating the entire (*a*b) space to cover the skin color to be moved as shown in FIGS. 19 and 20.

For example, the skin color region is moved by integrating the (*a*b) space with Δdi according to the following equation.
Δdi(x) is an integration amount of Δdi in the x space.

$$*a = *a \times \Delta di(a)$$

$$*b = *b \times \Delta di(b)$$

Also, as a conventional technique, Reference 1 and Reference 2 describe locally (partially) performing a color correction on a skin color.

[Reference 1] Japanese Laid-Open Publication No. 2002-185973

[Reference 2] Japanese Laid-Open Publication No. 2002-223366

When a color/luminance correction is locally (partially) performed, for example, on a skin color or a green color, the reproduction of the color and the luminance of the entire image rather than local (partial) image is altered with the conventional linear conversion, and as a result, the reproduction of images other than the local (partial) image would not be obtained in the aforementioned conventional color correction method. Also, when a simple non-linear conversion is used, there is a possibility that some portions are not represented due to a loss of continuity. In contrast, when a complex non-linear conversion is used, a processing amount (calculating amount) is excessive. For example, the aforementioned References 1 and 2 do not sufficiently consider reducing the burden of the processing amount.

Specifically, reference is made to the maximum amount of color space B2 after a correcting movement in FIG. 17. A problem occurs in that the color balance of other regions is affected along with the change of the entire color space. Also, depending on a display apparatus using a conventional image processing apparatus, it is considered that the region B2 which has been moved from the region A2 would not be represented as the entire color space.

Also, in other skin color correction methods, there is a problem of affecting the color balance of other regions as shown in FIG. 20. This problem occurs along with the change of the entire color space from the maximum amount of color space region A2 represented by an image processing apparatus to the maximum amount of color space region C2 after a correcting movement. Also, when a region A3 is moved to a region B3, the region A3 becomes a region C3, which is slightly larger than the region A3 due to the integration of the region A3. As a result, as in the case of FIG. 17, depending on the particular display apparatus which uses an image processing apparatus, it is considered that the region C2, which has been enlarged from the region A2 after the correcting movement, becomes a region which is not represented by the entire color space due to its protrusion from the region represented by the apparatus.

In this manner, the conventional techniques perform a color correction on skin color by using respective skin color correction methods described above. However, in the conventional techniques as described above, not only the change of skin color but also the change of other colors and the balance with respect to the maximum amount of space represented by the display apparatus must be considered and adjusted in order to perform a color correction on the skin color.

References 1 and 2 describe color correction methods in which color corrections are performed in a non-linear manner. However, Reference 1 does not take the amount of processing into consideration and thus, the amount of processing is excessively large, thereby resulting in an increase in the size of a circuit and software. Reference 2 does not specifically describe the methodology for the color correction.

The present invention is made to solve the aforementioned conventional problems and the objective thereof is to provide: an image processing apparatus capable of not changing a surrounding color region outside a selected color region to be corrected, of not clipping the moved region due to its protrusion from the region represented by an apparatus and of suppressing an increase of the processing amount (calculation amount) by locally performing a color correction by using a continuous non-linear conversion; a camera apparatus using the same; an image output apparatus (e.g., a liquid crystal display (LCD) or a printer) using the same; an image processing method using the image processing apparatus; a color correction processing program for instructing a computer to perform the method; and a computer readable recording medium for recording the same.

SUMMARY OF THE INVENTION

According to one aspect of the present invention, an image processing apparatus is provided for performing color correction on input values of input signals in a predetermined region to be corrected in a color coordinate system. The image processing apparatus includes: a movement amount calculating section for calculating movement amounts indicating how much the input values should be moved, in accordance with a distance between the input values and the center of the region to be corrected; and a color correction section for performing color correction on the input values, by moving the input values based on the calculated movement amounts, wherein the movement amount calculating section calculates the movement amounts such that the movement amounts become smaller as the distance between the input values and the center of the region to be corrected becomes larger.

In one embodiment of the present invention, the movement amount calculating section calculates the movement amounts such that the movement amounts become close to "0" as the input values approach an outer peripheral boarder of the region to be corrected.

In one embodiment of the present invention, the movement amount calculating section calculates the movement amounts such that the movement amounts become "0" when the input values are located at an outer peripheral boarder of the region to be corrected.

In one embodiment of the present invention, changing amounts of the movement amounts are set to be equal between the center of the region to be corrected and an outer peripheral border of the region to be corrected.

In one embodiment of the present invention, the movement amount calculating section calculates the movement amounts in accordance with the following equation: (1−(the distance between the input values and the center of the region to be corrected)/(conditional data which defines the region to be corrected))×(a maximum distance of the movement amounts).

In one embodiment of the present invention, the maximum distance of the movement amounts is a distance between the center of the region to be corrected and the center of an ideal color region.

In one embodiment of the present invention, the movement amount calculating section and the color correction section are implemented by software.

In one embodiment of the present invention, the movement amount calculating section and the color correction section are implemented by hardware.

In one embodiment of the present invention, the image processing apparatus further includes: an input value determining section for determining whether or not the input values are located within the region to be corrected, in accordance with the distance between the input values and the center of the region to be corrected, wherein, when it is determined that the input values are located within the region to be corrected, the movement amount calculating section calculates the movement amounts, and the color correction section performs the color correction.

In one embodiment of the present invention, an image processing apparatus further includes: a distance calculating section for calculating a distance between the input values and the center of the region to be corrected.

In one embodiment of the present invention, the region to be corrected is defined as a sphere or a circle having a radius r, the center of the sphere or the circle is located at the center of the region to be corrected, the input value determining section determines whether or not the distance between the input values and the center of the region to be corrected is smaller than or equal to the radius r.

In one embodiment of the present invention, the region to be corrected is defined as a cube or a square having a length r on each side, the center of the cube or the square is located at the center of the region to be corrected, wherein the input value determining section determines whether or not all of the coordinate components of the input values are located within the region to be corrected.

In one embodiment of the present invention, the input value determining section determines whether or not all of coordinate components of the input values are located within the region to be corrected, by determining whether or not a relationship of (a distance corresponding to the coordinate component of the input values)<(a distance corresponding to the length r of the sphere or the square) is satisfied for each of the coordinate components of the input values.

In one embodiment of the present invention, the input value determining section determines whether or not all of coordinate components of the input values are located within the region to be corrected, by determining whether or not a relationship of (a minimum value of the coordinate value of the sphere or the square)<(the coordinate component of the input values)<(a maximum value of the coordinate value of the sphere or the square) is satisfied for each of the coordinate components of the input values.

In one embodiment of the present invention, an image processing apparatus further includes: a distance calculating section for calculating a distance between the input values and the center of the region to be corrected and outputting a voltage value corresponding to the distance; a comparing section for comparing the voltage value output from the distance calculating section with a voltage value corresponding to conditional data which defines the region to be corrected; and a signal selection section for selecting one of the color correction outputs from the color correction section and the input values, in accordance with the comparison result by the comparing section.

In one embodiment of the present invention, the comparing section includes an AND gate.

In one embodiment of the present invention, the movement amount calculating section is initiated in response to the output from the comparing section.

In one embodiment of the present invention, the signal selection section selects the color correction outputs from the color correction section when the input values are located within the region to be corrected, and selects the input values when the input values are not located within the region to be corrected.

In one embodiment of the present invention, the input image signals are one of L*a*b signals, RGB signals, CMYK signals, YUV signals and YCbCr signals of color specification systems.

In one embodiment of the present invention, the color coordinate system is a color coordinate system for one of L*a*b signals, RGB signals, CMYK signals, YUV signals and YCbCr signals of color specification systems.

In one embodiment of the present invention, the color coordinate system is a coordinate system of a luminance/color space for L*a*b signals or a coordinate system of a color plane for *a*b signals.

In one embodiment of the present invention, the region to be corrected is a local range in two dimensions or three dimensions.

In one embodiment of the present invention, the region to be corrected is one of a sphere, a circle, a cube, a square, a rotating object formed by rotating an ellipse around a long axis of the ellipse, an ellipsoid, a column, an ellipsoidal column and a square column.

In one embodiment of the present invention, the region to be corrected includes at least one of a skin color region, a blue color region and a green color region.

In one embodiment of the present invention, conditional data which defines the region to be corrected is a radius r when the region to be corrected is a sphere or a circle, and conditional data which defines the region to be corrected is a length r on each side when the region to be corrected is a cube or a square.

In one embodiment of the present invention, the color correction section performs a luminance correction on the input values in addition to the color correction on the input values.

According to one aspect of the present invention, a camera apparatus is provided. The camera apparatus includes: a solid state imaging apparatus including a plurality of pixels; and an image processing apparatus described above, wherein image signals for the respective pixels output from the solid state imaging apparatus are input to the image processing apparatus as the input image signals.

According to one aspect of the present invention, an image output apparatus is provided. The image output apparatus includes: an image processing apparatus described above; and an output apparatus for outputting image signals subjected to the color correction by the image processing apparatus.

According to one aspect of the preset invention, an image processing method is provided for performing color correction on input values of input signals in a predetermined region to be corrected in a color coordinate system. The image processing method includes the steps of: (a) calculating movement amounts indicating how much the input values should be moved, in accordance with a distance between the input values and the center of the region to be corrected; and (b) performing color correction on the input values, by moving the input values based on the calculated movement amounts, wherein in the step (a), the movement amounts are calculated, such that the movement amounts become smaller as the distance between the input values and the center of the region to be corrected becomes larger.

In one embodiment of the present invention, in the step (a), the movement amounts are calculated, such that the movement amounts become close to "0" as the input values approach an outer peripheral boarder of the region to be corrected.

In one embodiment of the present invention, in the step (a), the movement amounts are calculated, such that the movement amounts become "0" when the input values are located at an outer peripheral boarder of the region to be corrected.

In one embodiment of the present invention, the image processing method further includes the step of: determining whether or not the input values are located within the region to be corrected, in accordance with the distance between the input values and the center of the region to be corrected, wherein, when it is determined that the input values are located within the region to be corrected, the movement amounts are calculated in the step (a), and the color correction is performed in the step (b).

In one embodiment of the present invention, the image processing method further includes the step of: calculating a distance between the input values and the center of the region to be corrected.

In one embodiment of the present invention, in the step (b), a luminance correction on the input values is performed in addition to the color correction on the input values.

According to one aspect of the present invention, a color correction processing program is provided for making a computer execute the steps of the image processing method described above.

According to one aspect of the present invention, a computer readable recording medium is provided. The color correction processing program described above is recorded on the computer readable recording medium.

The function of the present invention will be described below. In the present invention, a center of a predetermined color region is located at a center of a local region to be corrected (e.g., skin color region or green color region). An ideal color region is included within the region to be corrected. The color correction processing is performed by moving the center of the region to be corrected to the center of the ideal color region. The color correction processing is performed within the selected region to be corrected, such that the movement amounts indicating how much the input values should be moved as the distance between the input values and the center of the region to be corrected becomes larger.

According to the present invention, the coordinates of the center of the region to be corrected (e.g., a skin color region) are shifted into an ideal color region to be targeted, as well as the region to be corrected. As a result, an accurate image having a color region realizing a suitable color-tone can be obtained without altering a surrounding color region outside the region to be corrected.

The movement amounts (changing amounts) are set in accordance with a distance between the center of the region to be corrected and the input values of the input image signals. Specifically, the movement amounts (changing amounts) are set, such that they become smaller as the input values approach from the center of the region to be corrected to the outer peripheral portion of the region to be corrected, and such that they are "0"s when the input values are located at the outer peripheral portion of the region to be corrected.

Thus, it is possible to prevent any influence to other color regions which are outside of the region to be corrected. It is also possible to establish an appropriate color reproduction on a selected color region. It is also possible not to produce any discrete color spaces. As a result, it is possible to eliminate the conventional problem (i.e., the change (or movement) of the entire color space which causes an excessive amount of shifting of the color region such that the corrected color region cannot be displayed on certain display apparatus or printed on certain printer depending on the performance capability of the display apparatus or the printer. Clipping of the color region by the shifted amount of the color region may occur on such a display apparatus or printer).

Further, since a region (space) to be color-corrected is set, a large amount of software is not required. Further, since the calculation is very simple, a large scale circuit is not required. Therefore, the present invention is applicable to various apparatuses, such as a display apparatus and a printer.

As described above, according to the present invention, the color correction processing is performed by moving the center of a predetermined color region to the center of an ideal color region. The color correction processing is performed within the region to be corrected of the color coordinate system, such that the movement amounts indicating how much the input values should be moved for color correction become smaller as the distance between the input values of the input image signals and the center of the region to be corrected becomes larger. As a result, the surrounding color region outside the region to be corrected is not changed and the region after the movement does not protrude from the region represented by the apparatus. Therefore, clipping of such a protruded region does not occur. Also, an increase of the processing amount (calculation amount) can be suppressed.

These and other advantages of the present invention will become apparent to those skilled in the art upon reading and understanding the following detailed description with reference to the accompanying figures.

BRIEF DESCRIPTION OF THE DRAWINGS

The patent or application file contains at least one drawing executed in color. Copies of this patent or patent publication with color drawing(s) will be provided by the Office upon request and payment of the necessary fee.

FIG. 21 is a diagram for explaining a software algorithm equivalent to Embodiment 8 of the present invention.

FIG. 22 is a diagram for explaining a software algorithm equivalent to Embodiment 9 of the present invention.

Figure 1:
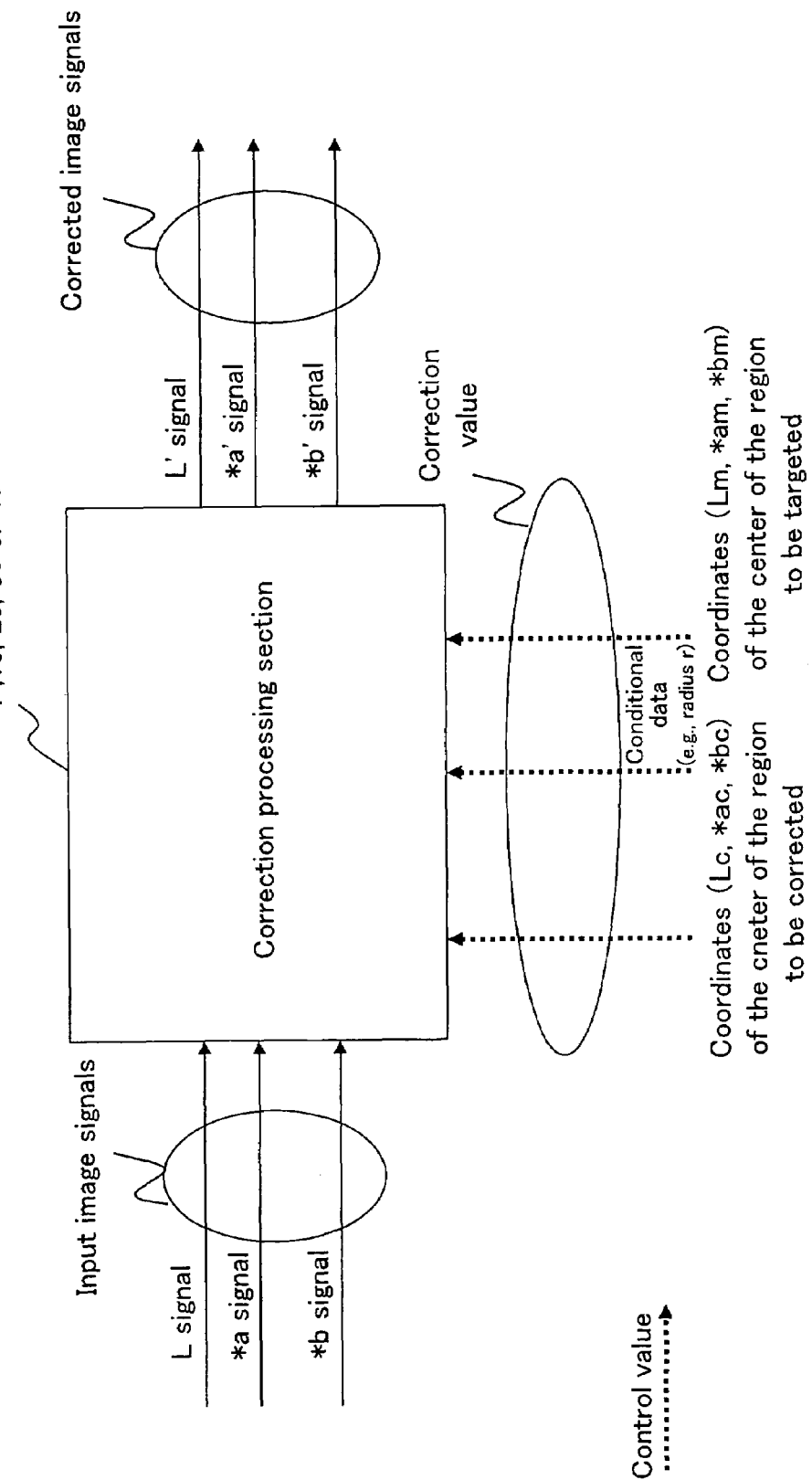
FIG. 1 is a block diagram showing an example of the basic structure of an image processing apparatus according to the present invention.

1, 10, 10A, 20, 20A, 30, 40, 70 correction processing section
11, 11A, 31 ROM
12, 12A, 32 RAM
13, 13A, 33 CPU
131, 131A distance calculating section
132, 132A, 132B, 332, 332A input determining section
133, 133A, 333 movement amount calculating section
134, 134A, 334 color correction section
21, 21A, 41, 131 distance calculating section
22, 42, 42A comparator
43 AND gate
23, 23A, 44 movement amount calculating section
24, 24A, 45 color correction section
25, 46 selector

DESCRIPTION OF THE PREFERRED EMBODIMENTS

Hereinafter, the basic structure of an image processing apparatus and an image processing method according to the present invention will be described with reference to FIG. 1 before the details of Embodiments 1 to 9 of the image processing apparatus and the image processing method according to the present invention are described.

FIG. 1 is a block diagram showing an example of the basic structure of an image processing apparatus according to the present invention. In this example, L signal, *a signal and *b signal are used. These signals are generally used as input image signals.

In FIG. 1, the image processing apparatus according to the present invention includes a correction processing section 1.

The correction processing section 1 includes an input mechanism for receiving input signals (e.g. L signal, *a signal, *b signal) to be corrected.

The correction processing section 1 further includes a correction mechanism for performing a color correction on the coordinates (Lc, *ac, *bc) of the center (or the center of gravity) of a local space (or a local plane) to be corrected and the input signals to be corrected. The local space (or a local plane) to be corrected is referred to as a region to be corrected. The color space of the region to be corrected is defined, for example, as an inner space of a sphere or a circle.

The correction processing section 1 further includes an input mechanism for receiving conditional data which defines the region to be corrected. For example, when the color space of the region to be corrected is defined as an inner space of a sphere or a circle, the conditional data is the radius r of the sphere or the circle.

The correction processing section 1 further includes an input mechanism for receiving the coordinates (Lm, *am, *bm) of the center of an ideal color space to be targeted.

The correction processing section 1 further includes an output mechanism for outputting the input signals which have been corrected.

The coordinates (Lc, *ac, *bc) of the center of the region to be corrected (e.g., a skin color region), the coordinates (Lm, *am, *bm) of the center of the ideal color region to be targeted (e.g., a color region in which a human can observe a skin color more vivid statistically), and conditional data which defines the region to be corrected (e.g., radius r of the sphere and the circle) are previously stored in an external (or internal) storage section (not shown in FIG. 1).

In this case, the conditional data (e.g., radius r) is set, such that the coordinates of the center of the ideal color region are located within the region to be corrected. To the greatest extent possible, the conditional data is set such that the coordinates of the center of the region to be corrected and the coordinates of the center of the ideal region to be targeted are spaced by a predetermined distance. The vector representing the movement amounts of the input values is set, such that the movement amounts of the input values becomes maximum when the input values are located at the center of the region to be corrected, such that the movement amounts of the input values become smaller as the input values approach from the center of the region to be corrected to an outer peripheral border of the region to be corrected, and such that the movement amounts of the input values are "0"s when the input values are located at the outer peripheral border of the region to be corrected.

According to the correction processing section 1, the coordinates of the center of the region to be corrected (e.g., a skin color region) are shifted into an ideal color region to be targeted, as well as the region to be corrected. As a result, an accurate image having a color region realizing a suitable color-tone can be obtained without altering a surrounding color region outside the region to be corrected.

The movement amounts (changing amounts) are set in accordance with a distance between the center of the region to be corrected and the input values of the input image signals. Specifically, the movement amounts (changing amounts) are set, such that they become smaller as the input values approach from the center of the region to be corrected to the outer peripheral portion of the region to be corrected, and such that they are "0"s when the input values are located at the outer peripheral portion of the region to be corrected.

Thus, it is possible to prevent any influence to other color regions which are outside of the region to be corrected. It is also possible to establish an appropriate color reproduction on a selected color region. It is also possible not to produce any discrete color spaces. As a result, it is possible to eliminate the conventional problem (i.e., the change (or movement) of the entire color space which causes an excessive amount of shifting of the color region such that the corrected color region cannot be displayed on certain display apparatus or printed on certain printer depending on the performance capability of the display apparatus or the printer. Clipping of the color region by the shifted amount of the color region may occur on such a display apparatus or printer).

Further, since a region (space) to be color-corrected is set, a large amount of software is not required. Further, since the calculation is very simple, a large scale circuit is not required. Therefore, the present invention is applicable to various apparatuses, such as a display apparatus and a printer.

As described above, the present invention is directed to a color correction method for processing a color range (space or plane) in a non-linear manner. The color range to be processed is set as a local range (space or plane). By using a simple and easy mechanism without increasing a processing amount, the color correction method enables optimally performing the color-correction on the input image signals within the set range (space or plane) while keeping the continuity between the inside and outside of the region to be color-corrected, without providing any adverse influence on other color regions surrounding the region to be color-corrected.

In the present invention, the input signals to the correction processing section 1 are not limited to L*a*b signals (L signal, *a signal and *b signal). Any signals representing image signals of all the color specification systems (such as RGB signals, CMYK signals, YUV signals, YCbCr signals) can be used as the input signals.

Further, the region to be corrected is not limited to a sphere or a circle. Any two-dimensional or three-dimensional local color space (or plane) (such as a cube, a square, a rotating object obtained by rotating around a long axis of an ellipse, an ellipsoid, a column, an ellipsoidal column and a square column) can be used as the region to be corrected.

Further, a plurality of radius r can be set as the conditional data defining the region to be corrected, a plurality set of coordinates can be set as the coordinates of the centers of a plurality of ideal color regions, and a plurality set of coordinates can be set as the coordinates of the centers of a plurality of regions to be corrected. In this case, it is possible to perform the color correction processing on a plurality of local color spaces or a plurality of local color planes.

The input image signal may be one of L*a*b signals, RGB signals, CMYK signals, YUV signals and YCbCr signals, which are signals of the color specification systems. The color coordinate system may be a color coordinate system for one of L*a*b signals, RGB signals, CMYK signals, YUV signals and YCbCr signals, which are signals of the color specification systems. In this case, luminance can be corrected when the color correction processing is performed.

The relationship between L*a*b signals, RGB signals, CMYK signals (i.e., four-dimensional parameters such as a color addition method for printers), YUV signals and YCbCr signals will be described below. The following shows the relationship between them, originating from RGB signals.

[YUV]

$Y=0.299R+0.587G+0.114B$ $U=-0.169R-0.331G+0.500B$ $V=0.500R-0.419G-0.081B$

[YCbCr]

$Y=0.257R+0.504G+0.098B+16$ $Cb=-0.148R-0.291G+0.439B+128$ $Cr=0.439R-0.368G-0.071B+128$

[CMYK]

Cyan=$G+B$

Magenta=$R+B$

Yellow=$R+G$

K(Black)=0

[L*a*b]

As described above.

Hereinafter, embodiments and examples will be described in detail in Embodiments 1 to 9.

Embodiment 1

In Embodiment 1, input values of input image signals (L signal, *a signal, *b signal) are color-corrected so that the corrected input values are located within an ideal color region. In this embodiment, the local region to be corrected is defined as a sphere having a center and a radius r. The center of the sphere is located at the coordinates (Lc, *ac, *bc) of the center of the region be corrected. In this embodiment, a color correction method is implemented by software.

Figure 2:
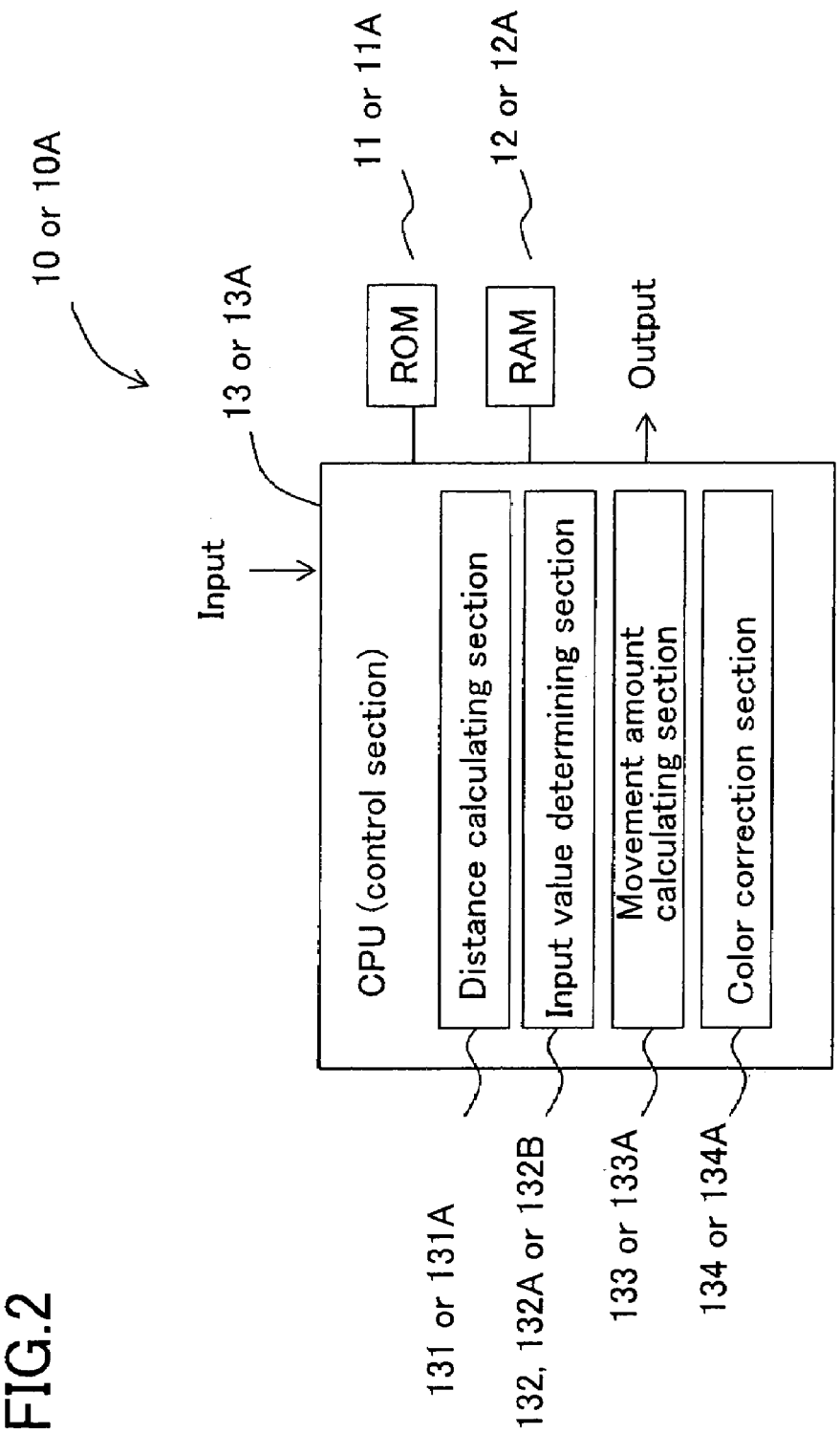
FIG. 2 is a block diagram showing an example of the basic structure of the correction processing section in Embodiment 1.

FIG. 2 is a block diagram showing an example of the basic structure of the correction processing section 10 according to Embodiment 1 (FIG. 1). Herein, L*a*b signals which are generally used are used as the input signals.

In FIG. 2, the correction processing section 10 of Embodiment 1 includes a ROM 11, a RAM 12 and a CPU 13 (Central Processing Unit).

The ROM 11 functions as a first storage section for storing a correction processing program and various data for the correction processing program.

The RAM 12 functions as a second storage section functioning as a work memory. When the correction processing section 10 is initiated, the correction processing program and the various data are input to the RAM 12 and are stored therein.

The CPU 13 functions as a control section for performing a color correction processing, based on the correction processing program, the various data, the input values of the input image signals (L signal, *a signal, *b signal), conditional data (e.g. radius r) which defines a local region to be corrected, the coordinates (Lc, *ac, *bc) of the center of the region to be corrected and the coordinates (Lm, *am, *bm) of the center of the ideal color region to be targeted. The color correction processing is performed by moving the center of a predetermined color region (i.e., the coordinates of the center of the region to be corrected) to the center of an ideal color region (i.e., the coordinates of the center of ideal region to be targeted). The color correction processing is performed within the region to be corrected (e.g. a sphere having radius r), such that the movement amounts indicating how much the input values should be moved for the purpose of color correction become smaller as the distance between the input values and the coordinates of the center of the region to be corrected become larger.

The correction processing program can be recorded on a computer readable recording medium. Various type of memories (e.g. IC memory, optical disc (CD), magnetic disc (FD) or hard disc) are used as the ROM 11 or the RAM 12.

The CPU 13 includes a distance calculating section 131, an input value determining section 132, a movement amount calculating section 133 and a color correction section 134.

The distance calculating section 131 calculates the distance between the input values of the input image signals and the coordinates (Lc, *ac, *bc) of the center of the region to be corrected.

The input value determining section 132 determines whether or not the distance between the input values of the input image signals and the coordinates (Lc, *ac, *bc) of center of the region to be corrected is smaller than or equal to radius r.

The movement amount calculating section 133 calculates movement distances (movement amounts) indicating how much the input values should be moved for the purpose of color correction.

The color correction section 134 corrects the luminance and/or the color of the input values by moving the input values of the input image signals by the calculated movement distances (movement amounts).

The operation of the correction processing section 10 will be described below.

Figure 3:
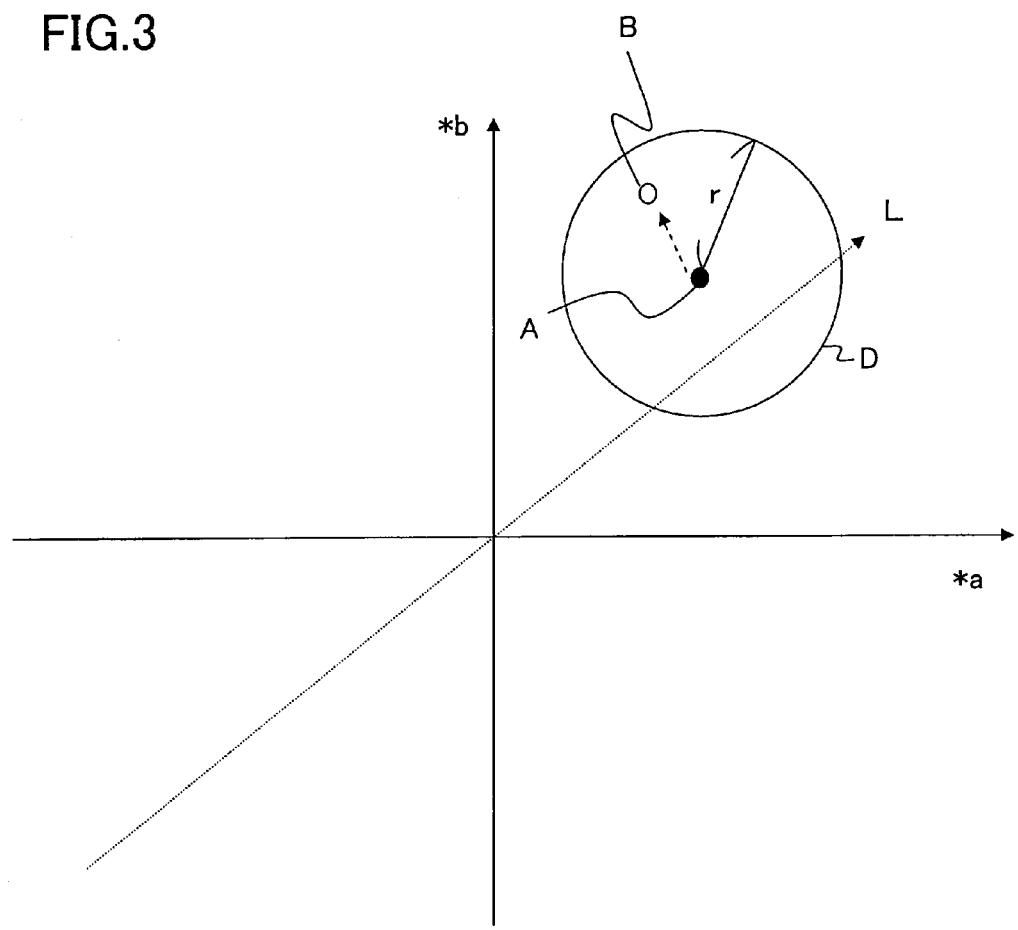
FIG. 3 is a diagram showing center A of a region to be corrected, center B of an ideal color region, and sphere D having a center and radius R, in the three-dimensions. The center of the sphere D is located at the center A of the region to be corrected.
Figure 4:
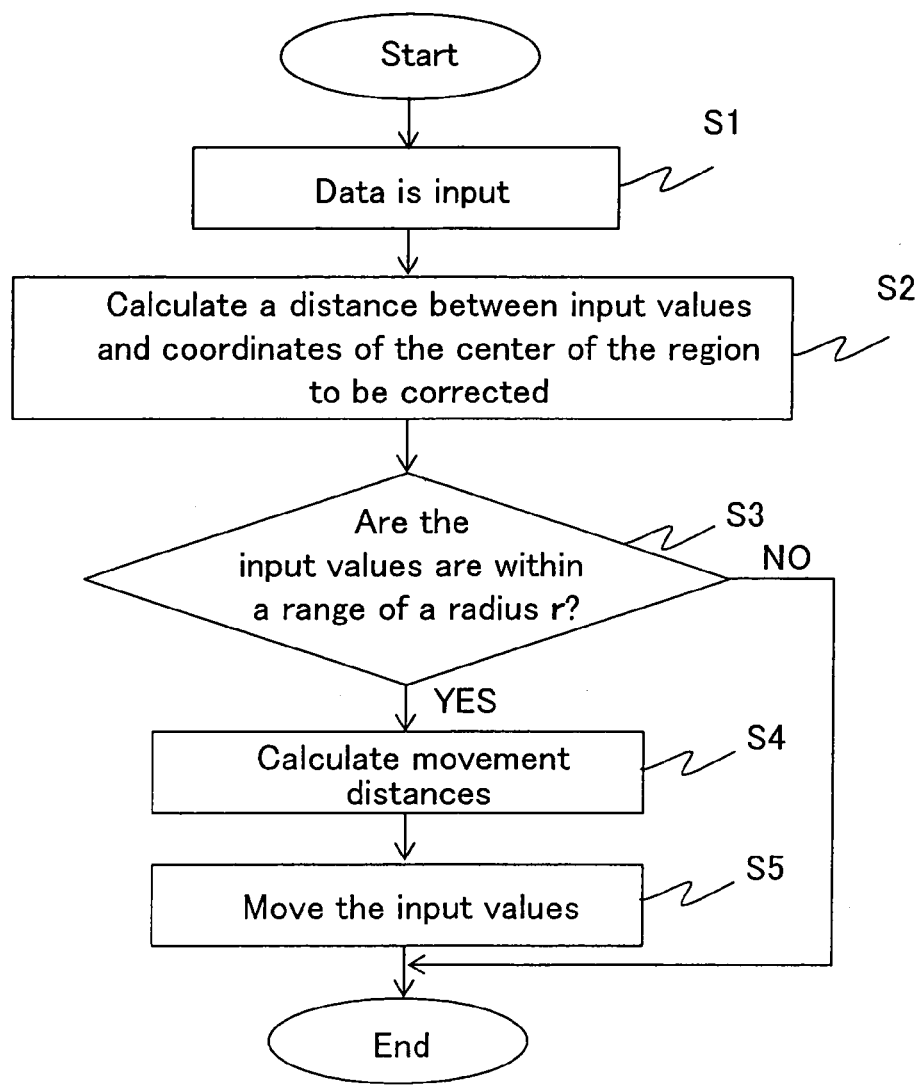
FIG. 4 is a flowchart showing a procedure of a correction processing performed by the correction processing section shown in FIG. 2.

FIG. 3 is a diagram showing center A of a region to be corrected, center B of an ideal color region, and sphere D having a center and radius r, in the three-dimensions. The center of the sphere D is located at the center A of the region to be corrected. FIG. 4 is a flowchart showing a procedure of the correction processing performed by the correction processing section 10 shown in FIG. 2.

As shown in FIGS. 3 and 4, in step S1, the coordinates (Lc, *ac, *bc) of the center of the region to be corrected and radius r of the sphere D are given to the correction processing section 1. Further, the coordinates (Lm, *am, *bm) of the center of the ideal color region to be targeted are given to the correction processing section 1. Herein, the coordinates (Lm, *am, *bm) are located within the region to be corrected (i.e., within the sphere D having the center at the coordinates (Lc, *ac, *bc) and radius r).

The distance between the coordinates (Lc, *ac, *bc) of the center of the region to be corrected and the coordinates (Lm, *am, *bm) of the center of the ideal color region to be targeted is calculated as distance components for respective components of the L, *a, *b space. The distance components are denoted as (DisL, Dis*a, Dis*b). The distance components (DisL, Dis*a, Dis*b) are predetermined. The distance components (DisL, Dis*a, Dis*b) are defined as maximum movement amounts of the input image signals in the color correction processing of the present invention.

$$DisL = |Lc - Lm| \quad \text{equation 1}$$

$$Dis*a = |*ac - *am| \quad \text{equation 2}$$

$$Dis*b = |*bc - *bm| \quad \text{equation 3}$$

Next, in step S2, the distance between the input values of the input image signals and the coordinates (Lc, *ac, *bc) of the center of the region to be corrected is calculated.

Herein, the input values of the input image signals in a unit of one pixel are denoted as [Lx, *ax, *bx]. The distance between the input values of the input image signals and the coordinates (Lc, *ac, *bc) of the center of the region to be corrected is calculated for each pixel. The distance is denoted as DisIn. The distance DisIn is calculated by the following equation.

$$DisIn = (|Lc - Lx|^2 + |*ac - *ax|^2 + |*bc - *bx|^2)^{(1/2)}$$

By referring to the distance DisIn, it is recognized, for each pixel, how the input values of the input image signals are far from the coordinates (Lc, *ac, *bc) of the center of the region to be corrected.

In step S3, it is determined whether or not the distance DisIn between the input values and the coordinates (Lc, *ac, *bc) of the center of the region to be corrected is smaller than or equal to radius r.

If the determination result is "Yes" in step S3, then step S4 (movement amounts calculating process) and step S5 (color correction process) are performed.

In step S4, the movement distances (movement amounts) indicating how much the input values should be moved for the purpose of color correction are calculated. In step S5, the luminance and/or color of the input values [Lx, *ax, *bx] of the input image signals are corrected such that the corrected input values [Ly, *ay, *by] are within the ideal color region, by moving the input values [Lx, *ax, *bx] by the movement distances calculated in step S4.

The corrected input values [Ly, *ay, *by] can be obtained from the input values [Lx, *ax, *bx] by the following equations. This is the result derived by moving the coordinates (Lc, *ac, *bc) of the center of the region to be corrected to the coordinates (Lm, *am, *bm) of the center of the ideal color region to be targeted.

$$Ly = Lx \pm ((1 - DisIn/r) \times DisL) \quad \text{equation 4}$$

$$*ay = *ax \pm ((1 - DisIn/r) \times Dis*a) \quad \text{equation 5}$$

$$*by = *bx \pm ((1 - DisIn/r) \times Dis*b) \quad \text{equation 6}$$

If the determination result is "No" in step S3, then step S4 (movement amounts calculating process) and step S5 (color correction process) are not performed. In this case, the corrected input values [Ly, *ay, *by] can be obtained from the input values [Lx, *ax, *bx] by the following equations.

$$Ly = Lx \quad \text{equation 7}$$

$$*ay = *ax \quad \text{equation 8}$$

$$*by = *bx \quad \text{equation 9}$$

As described above, according to Embodiment 1, the equations 4-6 indicate that the movement distances (movement amounts) for color correction become larger as the input values of the input image signals are located closer to the coordinates (Lc, *ac, *bc) of the center of the region to be corrected, and that the movement distances (movement amounts) for color correction become smaller as the input values of the input image signals are located further from the coordinates (Lc, *ac, *bc) of the center of the region to be corrected. As a result, it is possible to prevent an increase of the discreteness between the inside and the outside of the region to be corrected (e.g., the sphere D having radius r). It is also possible to move the input values by the maximum movement distance when the input values are located at the coordinates (Lc, *ac, *bc) of the center of the region to be corrected. Therefore, it is also possible to realize an ideal color representation for a predetermined color region while keeping the image continuity between the inside and the outside of the sphere D.

Embodiment 2

In Embodiment 2, input values of input image signals (L signal, *a signal, *b signal) are color-corrected so that the corrected input values are located within an ideal color region. In this embodiment, the local region to be corrected is defined as a sphere having a center and a radius r. The center of the sphere is located at the coordinates (Lc, *ac, *bc) of the center of the region be corrected. In this embodiment, a color correction method is implemented by hardware.

Figure 5:
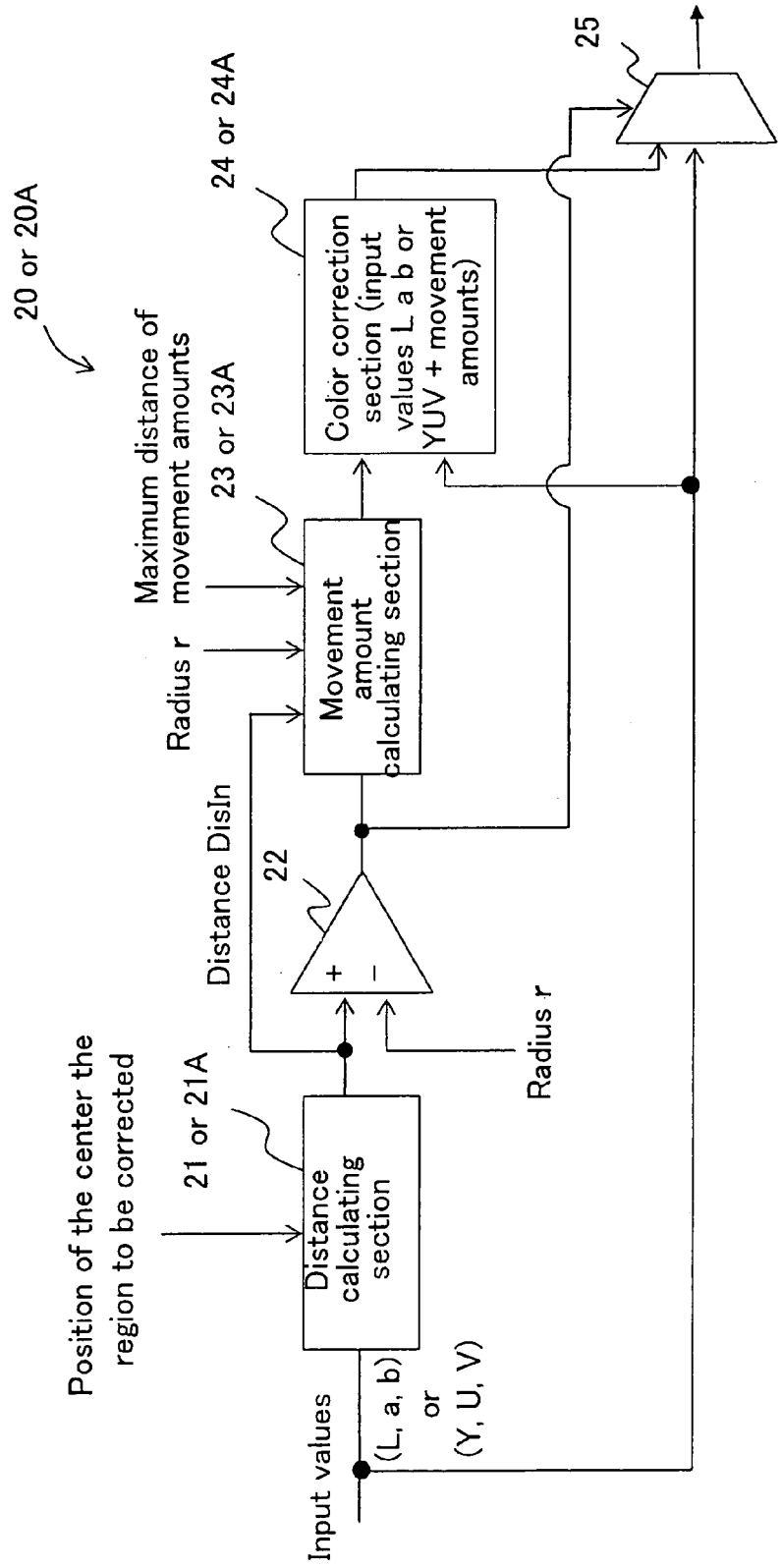
FIG. 5 is a block diagram showing an example of the basic structure of the correction processing section in Embodiment 2.

FIG. 5 is a block diagram showing an example of the basic structure of the correction processing section 20 according to Embodiment 2 (FIG. 1).

In FIG. 5, the correction processing section 20 of Embodiment 2 includes a distance calculating section 21, a comparator 22, a movement amount calculating section 23, a color correction section 24 and a selector 25.

The distance calculating section 21 calculates a distance between the input values (L, *a, *b) of the input image signals and the coordinates (Lc, *ac, *bc) of the center of the region to be corrected as a voltage value for comparison.

The comparator 22 functions as a comparing section (input value determining section) for determining whether or not the distance between the input values and the coordinates (Lc, *ac, *bc) of the center of the region to be corrected is smaller than or equal to radius r. Specifically, the comparator 22 compares (1) a voltage value corresponding to the distance between the input values of the input image signals and the coordinates (Lc, *ac, *bc) of the center of the region to be corrected with (2) a voltage value corresponding to the radius r as the conditional data which defines the sphere D of the region to be corrected, and outputs the comparison result.

The movement amount calculating section 23 calculates movement distances (movement amounts) indicating how much the input values should be moved for the purpose of color correction. The movement amount calculating section 23 is initiated when the comparison result is a voltage at a high level. The movement amount calculating section 23 is not initiated when the comparison result is a voltage at a low level.

The color correction section 24 corrects the luminance and/or the color of the input values by moving the input values of the input image signals by the calculated movement distances (movement amounts).

The selector 25 functions as a signal selection section for selecting one of the color correction outputs from the color correction section 24 and the input values of the input image signals, in accordance with the comparison result output from the comparator 22. The selector 25 is controlled to select the color correction outputs from the color correction section 24 when the distance between the input values and the coordinates (Lc, *ac, *bc) of the center of the region to be corrected is smaller than or equal to the radius r. The selector 25 is controlled to select the input values when the distance between the input values and the coordinates (Lc, *ac, *bc) of the center of the region to be corrected is greater than the radius r.

The operation of the correction processing section 20 will be described below.

The input values [Lx, *ax, *bx] of the input image signals and the coordinates (Lc, *ac, *bc) of the center of the region to be corrected are input to the distance calculating section 21. The distance calculating section 21 calculates a distance between the input values [Lx, *ax, *bx] of the input image signals and the coordinates (Lc, *ac, *bc) of the center of the region to be corrected (i.e. the distance DisIn described above).

Next, an input voltage value corresponding to the distance DisIn and a reference voltage value corresponding to the radius r are input to the comparator 22. The comparator 22 compares the distance DisIn with the radius r. When the distance DisIn is larger than the radius r, the comparator 22 outputs a voltage at a low level as a signal indicating the comparison result at its output end. When the distance DisIn is smaller than or equal to the radius r (i.e., when the input values [Lx, *ax, *bx] are located within the region to be corrected), the comparator 22 outputs a voltage at a high level as a signal indicating the comparison result at its output end.

A signal indicating the comparison result from the comparator 22 is input to the movement amount calculating section 23. A signal corresponding to the radius r and a signal corresponding to the maximum distance of the movement amount are further input to the movement amount calculating section 23. The maximum distance of the movement amount is a distance between the coordinates (Lc, *ac, *bc) of the center of the region to be corrected and the coordinates (Lm, *am, *bm) of the center of the ideal color region to be targeted. The maximum distance of the movement amount is predetermined. The movement amount calculating section 23 is initiated only when the comparison result signal is a voltage at a high level. Once the movement amount calculating section 23 is initiated, it calculates movement distances (movement amounts) indicating how much the input values [Lx, *ax, *bx] of the input image signals should be moved for the purpose of color correction. The equations 4-6 described above are used for this calculation.

The movement distances (movement amounts) from the movement amount calculating section 23 and the input values [Lx, *ax, *bx] of the input image signals are input to the color correction section 24. The color correction section 24 adds the movement distances (movement amounts) calculated by the movement amount calculating section 23 to the input values [Lx, *ax, *bx] of the input image signals, respectively, so as to correct the luminance and/or the color of the input values.

The selector 25 selects the color correction outputs from the color correction section 24 when the distance between the input values of the input image signals and the coordinates (Lc, *ac, *bc) of the center of the region to be corrected is smaller than or equal to the radius r. The selector 25 outputs the input values of the input image signals in their original form without performing any color correction on the input values when the distance is larger than the radius r.

As described above, according to Embodiment 2, the movement distances (movement amounts) for color correction become larger as the input values of the input image signals are located closer to the coordinates (Lc, *ac, *bc) of the center of the region to be corrected. The movement distances (movement amounts) for color correction become smaller as the input values of the input image signals are located further from the coordinates (Lc, *ac, *bc) of the center of the region to be corrected. The movement distances (movement amounts) for color correction are set to "0"s when the input values of the input image signals are located at the outer peripheral portion of the region to be corrected (e.g., the sphere D). As a result, it is possible to prevent an increase of the discreteness between the inside and the outside of the region to be corrected (e.g., the sphere D). It is also possible to move the input values by the maximum movement distance when the input values are located at the coordinates (Lc, *ac, *bc) of the center of the region to be corrected. Therefore, it is also possible to realize an ideal color representation for a predetermined color region while keeping the image continuity between the inside and the outside of the sphere D.

Figure 6:
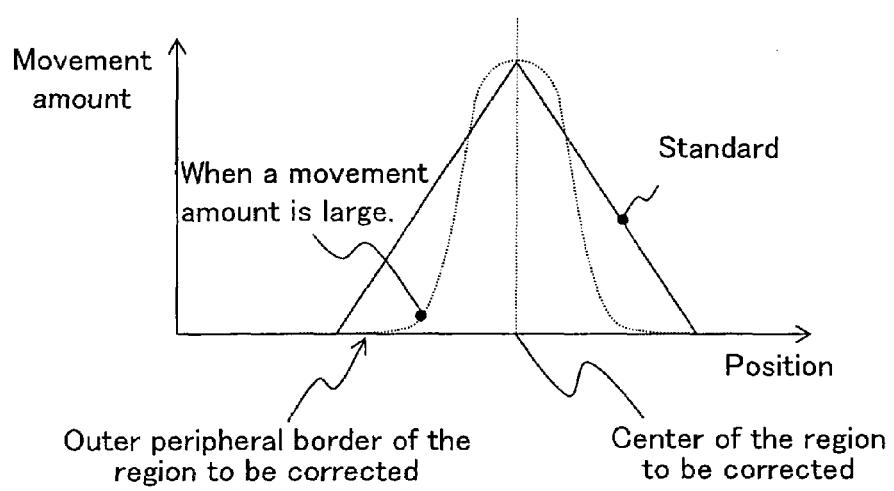
FIG. 6 is a diagram showing changing amount S of movement amounts of the input values with respect to positions in the color coordinate system in the present invention.

In Embodiments 1 and 2, as shown in the solid line in FIG. 6, the changing amount of the movement amount is set to be equal (same) between the coordinates (Lc, *ac, *bc) of the center of the region to be corrected and the outer peripheral border of the region to be corrected (e.g. the sphere D). The movement amount is calculated from the equation (1−(the distance between the input values and the center of the region to be corrected)/(the radius of the sphere))×(a maximum distance of the movement amounts).

Embodiment 3

In Embodiment 3, input values of input image signals (L signal, *a signal, *b signal) are color-corrected so that the corrected input values are located within an ideal color region. In this embodiment, the local region to be corrected is defined as a cube having a length r on each side. The center of the cube is located at the coordinates (Lc, *ac, *bc) of the center of the region be corrected. In this embodiment, a color correction method is implemented by software. In this embodiment, the distance is easily calculated from the coordinate values or a simple calculation on the coordinate values. As a result, the calculation of the color correction becomes easier.

Figure 7:
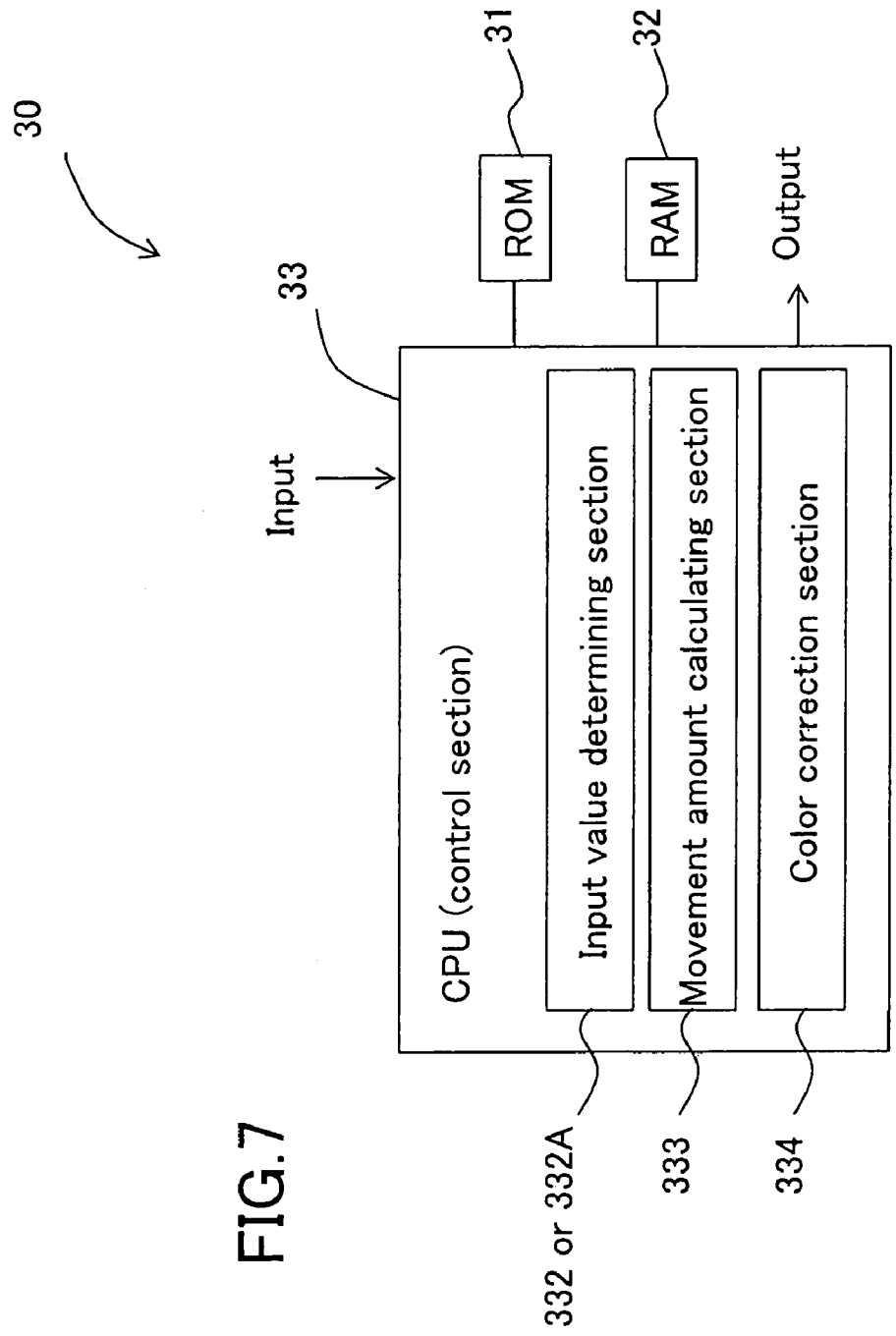
FIG. 7 is a block diagram showing an example of the basic structure of the correction processing section in Embodiment 3.

FIG. 7 is a block diagram showing an example of the basic structure of the correction processing section 30 in Embodiment 3 (FIG. 1).

In FIG. 7, the correction processing section 30 of Embodiment 3 includes a ROM 31, a RAM 32 and a CPU 33 (Central Processing Unit).

The ROM 31 functions as a first storage section for storing a correction processing program and various data for the correction processing program.

The RAM 32 functions as a second storage section functioning as a work memory. When the correction processing section 30 is initiated, the correction processing program and the various data are input to the RAM 32 and are stored therein.

The CPU 33 functions as a control section for performing a color correction processing, based on the correction processing program, the various data, the input values of the input image signals (L signal, *a signal, *b signal), length r of each side of the cube as the conditional data, the coordinates (Lc, *ac, *bc) of the center of the region to be corrected and the coordinates (Lm, *am, *bm) of the center of the ideal color region to be targeted. The color correction processing is performed by moving the center of a predetermined color region (i.e., the coordinates of the center of the region to be corrected) to the center of an ideal color region (i.e., the coordinates of the center of ideal region to be targeted). The color correction processing is performed within the region to be corrected (e.g. a cube having a length r on each side), such that the movements amount indicating how much the input values should be moved for the purpose of color correction become smaller as the distance between the input values and the coordinates of the center of the region to be corrected become larger.

The correction processing program can be recorded on a computer readable recording medium. Various type of memories (e.g. IC memory, optical disc (CD), magnetic disc (FD) or hard disc) are used as the ROM 31 or the RAM 32.

The CPU 33 includes an input value determining section 332, a movement amount calculating section 333 and a color correction section 334.

The input value determining section 332 determines whether or not each of the input values of the input image signals is located within the region to be corrected (i.e., within the cube having a length r on each side).

The movement amount calculating section 333 calculates the movement distances (movement amounts) indicating how much the input values should be moved for the purpose of color correction, in accordance with the distance between the input values and the coordinates (Lc, *ac, *bc) of the center of the region to be corrected.

The color correction section 334 corrects the luminance and/or color of the input values by moving the input values of the input image signals by the calculated movement distances (movement amounts).

Figure 8:
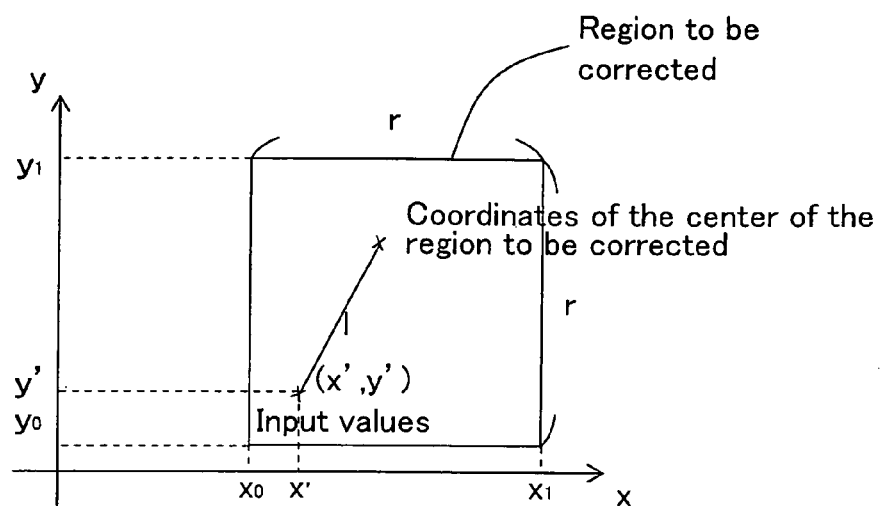
FIG. 8 is a diagram showing plane coordinates for explaining the operation of the input value determining section shown in FIG. 7.

With reference to plane coordinates shown in FIG. 8, the input value determining section 332 is sufficient to determine whether or not the relationship $x0<x'<x1$ and the relationship $y0<y'<y1$ are satisfied in order to determine whether or not the input values (x', y') of the input image signals are located within the square-shaped region to be corrected, each side of the region having a length r. Specifically, when the input value determining section 332 determines whether or not the input values (x', y') of the input image signals are located within the square-shaped region to be corrected, each side of the region having the length r, the input value determining section 332 is sufficient to determine whether or not the relationship (the minimum value of the coordinate component (e.g. x0))<(the coordinate component of the input values (e.g. x'))<(the maximum value of the coordinate component (e.g. x1)) is satisfied for each of the coordinate components (x', y') of the input values. Herein, the input value determining section 332 can make the determination for each component (i.e., each of L signal, *a signal and *b signal) of the color space coordinate system.

When it is determined whether or not the input values of the input image signals are located within the region to be corrected, which is a cube or a square having the length r on each side, it can be determined whether or not the relationship (a voltage value corresponding to the distance between a coordinate component of the input values and the center of the cube or the square)<(a voltage value corresponding to the length r) is satisfied for each of the coordinate components of the input values.

The movement amount calculating section 333 calculates distances 1 between the input values of the input image signals and the coordinates (Lc, *ac, *bc) of the center of the region to be corrected, and sets the movement amounts (vector amounts) in accordance with the distances 1 between the input values of the input image signals and the coordinates (Lc, *ac, *bc) of the center of the region to be corrected. The movement amounts are set, such that the movement amounts become smaller as the input values approach from the center of the region to be corrected to the outer periphery portion of the region to be corrected. The movement amounts are set to be "0"s when the input values are located at the outer periphery portion of the region to be corrected. The equations 4-6 described above are used to calculate the movement amounts.

The color correction section 334 corrects the luminance and/or the color of the input values by adding the movement amounts calculated by the movement amount calculating section 333 to the input values or by multiplying the movement amounts with the input values.

The operation of the correction processing section 30 will be described.

Figure 9:
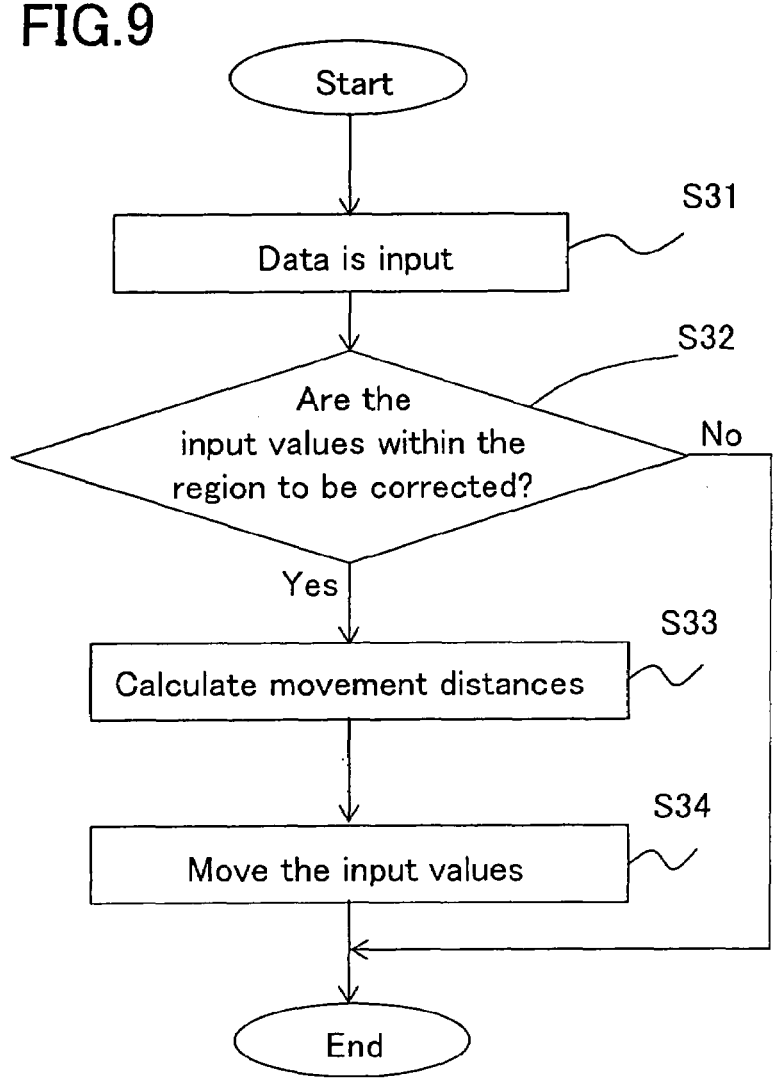
FIG. 9 is a flowchart showing a procedure of a correction processing performed by the correction processing section shown in FIG. 7.

FIG. 9 is a flowchart showing a procedure of the correction processing performed by the correction processing section 30 shown in FIG. 7.

As shown in FIG. 9, in step S31, various data is given to the correction processing section 30.

Specifically, the coordinates (Lc, *ac, *bc) of the center of the region to be corrected and length r of the cube are given to the correction processing section 30. Further, the coordinates (Lm, *am, bm) of the center of the ideal color region to be targeted is given to the correction processing section 30. Herein, the coordinates (Lm, *am, bm) are located within the region to be corrected (i.e., within the cube having the center at the coordinates (Lc, *ac, *bc) and length r on each side.

Next, in step S32, it is determined whether or not each coordinate component of the input values (L, *a, *b) is located within the cubic region to be corrected, each side of the region having the length r.

If it is determined in step S32 that all of coordinate components of the input values (L, *a, *b) are located within the cubic region to be corrected, each side of the region having the length r, then the step S33 (movement amounts calculating process) and the step S34 (color correction process) are performed.

In step S33, the movement amounts indicating how much the input values should be moved for the purpose of the color correction is calculated.

The distance between the coordinates (Lc, *ac, *bc) of the center of the region to be corrected and the coordinates (Lm, *am, *bm) of the center of the ideal color region to be targeted is calculated as distance components for respective components of the L, *a, *b space. The distance components are denoted as (DisL, Dis*a, Dis*b). The distance components (DisL, Dis*a, Dis*b) are predetermined. The distance components (DisL, Dis*a, Dis*b) are defined as maximum movement amounts of the input image signals in the color correction processing of the present invention.

$$Dis L=|Lc-Lm| \qquad \text{equation 1}$$

$$Dis*a=|*ac-*am| \qquad \text{equation 2}$$

$$Dis*b=|*bc-*bm| \qquad \text{equation 3}$$

Distance 1 between the input values of the input image signals and the coordinates (Lc, *ac, *bc) of the center of the region to be corrected is calculated.

Herein, the input values of the input image signals in a unit of one pixel are denoted as [Lx, *ax, *bx]. The distance between the input values of the input image signals and the coordinates (Lc, *ac, *bc) of the center of the region to be corrected is calculated for each pixel. The distance is denoted as DisIn. The distance DisIn is calculated by the following equation.

$$DisIn=(|Lc-Lx|^2+|*ac-*ax|^2+|*bc-*bx|^2)^{(1/2)}$$

By referring to the distance DisIn, it is recognized, for each pixel, how the input values of the input image signals are spaced by distance l from the coordinates (Lc, *ac, *bc) of the center of the region to be corrected.

In step S34, the luminance and/or the color of the input values [Lx, *ax, *bx] of the input image signals are corrected such that the corrected input values [Ly, *ay, *by] are within the ideal color region, by moving the input values by the movement distances calculated in step S33 (e.g. by adding the movement amounts to the input values).

The corrected input values [Ly, *ay, *by] can be obtained from the input values [Lx, *ax, *bx] by the following equations. This is the result derived by moving the coordinates (Lc, *ac, *bc) of the center of region to be corrected to the coordinates (Lm, *am *bm) of the center of the ideal color region to be targeted.

$$Ly=Lx\pm((1-DisIn/r)\times DisL) \qquad \text{equation 4}$$

$$*ay=*ax\pm((1-DisIn/r)\times Dis*a) \qquad \text{equation 5}$$

$$*by=*bx\pm((1-DisIn/r)\times Dis*b) \qquad \text{equation 6}$$

If it is determined in step S32 that at least one of coordinate components of the input values (L, *a, *b) are not located within the cubic region to be corrected, each side of the region having the length r, then the step S33 (movement amounts calculating process) and the step S34 (color correction process) are not performed. In this case, the corrected input values [Ly, *ay, *by] can be obtained from the input values [Lx, *ax, *bx] by the following equations.

$$Ly=Lx \qquad \text{equation 7}$$

$$*ay=*ax \qquad \text{equation 8}$$

$$*by=*bx \qquad \text{equation 9}$$

As described above, according to Embodiment 3, the equations 4-6 indicate that the movement distances (movement amounts) for color correction become larger as the input values of the input image signals are located closer to the coordinates (Lc, *ac, *bc) of the center of the region to be corrected, and that the movement distances (movement amounts) for color correction become smaller as the input values of the input image signals are located further from the coordinates (Lc, *ac, *bc) of the center of the region to be corrected. As a result, it is possible to prevent an increase of the discreteness between the inside and the outside of the region to be corrected (e.g., the cube having length r on each side). It is also possible to move the input values by the maximum movement distance when the input values are located at the coordinates (Lc, *ac, *bc) of the center of the region to be corrected. Therefore, it is also possible to realize an ideal color representation for a predetermined color region while keeping the image continuity between the inside and the outside of the cube having length r on each side.

Embodiment 4

In Embodiment 4, input values of input image signals (L signal, *a signal, *b signal) are color-corrected so that the corrected input values are located within an ideal color region. In this embodiment, the local region to be corrected is defined as a cube (or a square) having a length r on each side. The center of the cube (or the square) is located at the coordinates (Lc, *ac, *bc) of the center of the region be corrected. In this embodiment, a color correction method is implemented by hardware.

Figure 10:
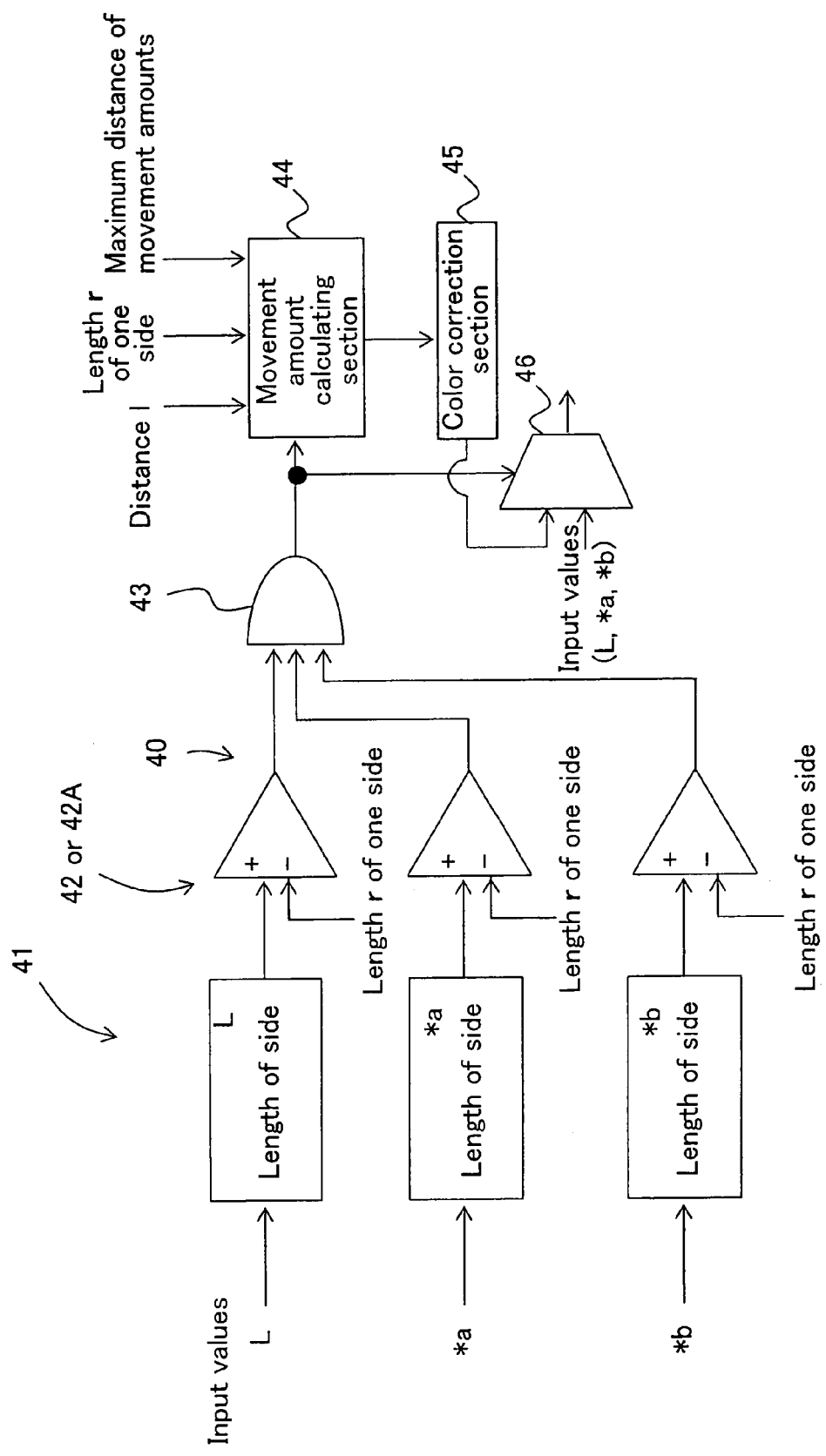
FIG. 10 is a block diagram showing an example of the basic structure of the correction processing section in Embodiment 4.

FIG. 10 is a block diagram showing an example of the basic structure of the correction processing section 40 in Embodiment 4 (FIG. 1).

In FIG. 10, the correction processing section 40 of Embodiment 4 includes a distance calculating section 41, comparators 42, an AND gate 43, a movement amount calculating section 44, a luminance/color correction section 45 and a selector 46.

The distance calculating section 41 converts each coordinate component of the input values (L, *a, *b) of the input image signals into a voltage value corresponding to a distance of the length r or a voltage value corresponding to the each coordinate component.

Each of the comparators 42 compares (1) the voltage value corresponding to the distance of the length r converted from one coordinate component with (2) a reference voltage value corresponding to the length r of each side of the cubic region to be corrected, and outputs the comparison result.

The AND gate 43 functions as an AND gate section for receiving the respective comparison results from the comparators 42, and for outputting the determination result indicating whether or not the input values are located within the region to be corrected. The AND gate 43 outputs the determination result indicating that the input values are located within the region to be corrected, only when all of the comparison results are voltages at a high level.

The movement amount calculating section 44 calculates movement distances (movement amounts) indicating how much the input values should be moved for the purpose of color correction. The movement amount calculating section 44 is initiated only when the AND gate 43 outputs a voltage at a high level.

The luminance/color correction section 45 corrects the luminance and/or the color of the input values by moving the input values of the input image signals by the calculated movement distances (movement amounts).

The selector 46 functions as a signal selection section for selecting one of the color correction outputs from the color correction section 45 and the input values (L, *a, *b) of the input image signals, in accordance with the determination result output from the AND gate 43.

When the distance calculating section 41 converts each coordinate component of the input values (L, *a, *b) into a voltage value corresponding to a distance of the length r, the comparator 42 compare the converted voltage value with the voltage value corresponding to the length r of each side of the cube (or square). The comparators 42 determine whether or not the relationship (a voltage value corresponding to the distance of each coordinate component)<(a voltage value corresponding to the length r on each side of the cube (or square)) is satisfied for each coordinate component of the input values.

Alternatively, when the distance calculating section 41 converts each coordinate component of the input values (L, *a, *b) into a voltage value corresponding to the coordinate component, the comparators 42 determine whether or not the relationship (the minimum value of the coordinate component)<(coordinate component of the input values)<(the maximum value of the coordinate value) is satisfied for each coordinate component of the input values.

The three comparators 42 (comparison section) and the AND gate 43 constitute an input value determining section, which determines whether or not the input values are located within the region to be corrected (i.e., within the cube).

The selector 46 is controlled to select the color correction outputs from the color correction section 45 only when the input values are located within the region to be corrected.

The operation of the correction processing section 40 will be described.

First, the distance calculating section 41 converts each component of the input values [Lx, *ax, *bx] of the input image signals into a voltage value for comparison. The voltage value corresponding to a distance of the length r of each side of the cube.

Next, each comparator 42 compares (1) the voltage value converted from each component of the input values so as to correspond to the distance of the length r with (2) a reference voltage value corresponding to the length r of each side of the cubic region to be corrected.

When the distance converted from the input values is larger than the length r, each comparator 42 outputs a voltage at a low level. When the distance converted from the input values is smaller than the length r, each comparator 42 outputs a voltage at a high level. Only when all of the comparison results output from the three comparators 42 are voltages at a high level (i.e., only when the input values are located within the cubic region to be corrected), the AND gate 43 outputs, as a determination result signal, a voltage at a high level indicating that the input values are located within the region to be corrected.

The determination result signal from the AND gate 43 is input to the movement amount calculating section 44. A signal corresponding to the length r, a signal corresponding to distance l and a signal corresponding to the maximum distance of the movement amounts are also input to the movement amount calculating section 44.

The maximum distance of the movement amounts is a distance between the coordinates (Lc, *ac, *bc) of the center of the region to be corrected and the coordinates (Lm, *am, *bm) of the center of the ideal color region to be targeted. The maximum distance is predetermined. Alternatively, the maximum distance of the movement amounts can be calculated by the movement amount calculating section 44.

The distance l is a distance between the input values of the input image signals and the coordinates (Lc, *ac, *bc) of the center of the region to be corrected.

The movement amount calculating section 44 is initiated only when the determination result signal is a voltage at a high level. The movement amount calculating section 44 calculates movement distances (movement amounts) indicating how much the input values [Lx, *ax, *bx] of the input image signal should be moved for the purpose of color correction. The equations 4-6 described above are used for this calculation.

The movement distances (movement amounts) from the movement amount calculating section 44 and the input values [Lx, *ax, *bx] of the input image signals are input to the color correction section 45. The color correction section 45 adds the calculated movement distances (movement amounts) to the input values [Lx, *ax, *bx] of the input image signals, respectively, so as to correct the luminance and/or the color of the input values.

The selector 46 selects color correction outputs from the color correction section 24 when the input values of the input image signals are located within the region to be corrected. The selector 46 outputs the input values of the input image signals in their original form without performing the color correction when the input values of the input image signals are not located within the region to be corrected.

As described above, according to Embodiment 4, the movement distances (movement amounts) for color correction become larger as the input values of the input image signals are located closer to the coordinates (Lc, *ac, *bc) of the center of the region to be corrected. The movement distances (movement amounts) for color correction become smaller as the input values of the input image signals are located further from the coordinates (Lc, *ac, *bc) of the center of the region to be corrected. The movement distances (movement amounts) for color correction are set to "0"s when the input values of the input image signals are located at the outer peripheral portion of the region to be corrected (e.g., the cube). As a result, it is possible to prevent an increase of the discreteness between the inside and the outside of the region to be corrected. It is also possible to move the input values by the maximum movement distance when the input values are located at the coordinates (Lc, *ac, *bc) of the center of the region to be corrected. Therefore, it is also possible to realize an ideal color representation for a predetermined color region while keeping the image continuity between the inside and the outside of the region to be corrected.

Embodiment 5

In Embodiment 5, input values of input image signals (L signal, *a signal, *b signal) are color-corrected so that the corrected input values are located within an ideal color region. In this embodiment, the local region to be corrected is defined as a rotating object obtained by rotating an ellipse has a long axis and a short axis around the long axis. The center of the rotating object is located at the coordinates (Lc, *ac, *bc) of the center of the region to be corrected. In this embodiment, a color correction method is implemented by software. In this case, the processing amount (calculating amount) of the color correction is reduced due to a decrease of selected range to be corrected compared to the regions to be corrected of the spheres D of Embodiments 1 and 2.

Figure 11:
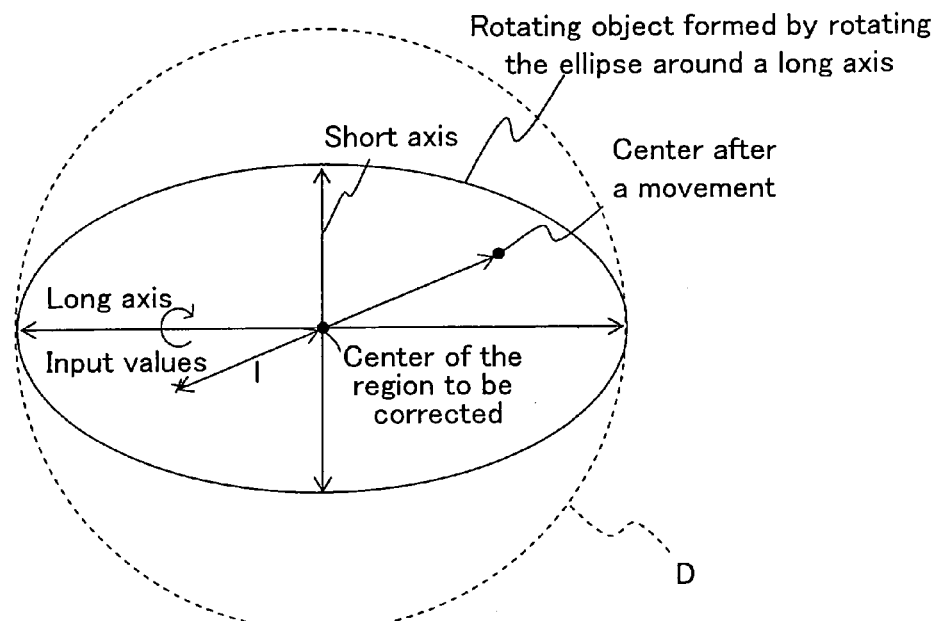
FIG. 11 is a diagram of space coordinates showing a local region to be corrected where a rotating object is rotated around the long axis of the ellipse in the correction processing section in Embodiment 5.

The structure of the correction processing section in Embodiment 5 is the same as the structure of the correction processing section in Embodiment 1 as shown in FIGS. 2 and 4, with the exception that in Embodiment 5, an input value determining section 132A instead of the input value calculating section 132 in FIG. 2 is provided to determine whether or not the input values (L, *a, *b) of the input image signals are located within a rotating object (a local region to be corrected) obtained by rotating the ellipse around the long axis of the ellipse as shown in FIG. 11.

The distance between the input values and the coordinates of the center of the region to be corrected calculated by the distance calculating section 131 in FIG. 2 is used by the movement amount calculating section 133 in FIG. 2. In this case, the selected range to be corrected can be smaller than the selected regions to be corrected of the spheres D of Embodiments 1 and 2.

In Embodiment 5, the color correction method of the present invention is implemented by software. However, the color correction method of the present invention can be implemented by hardware as well. When the color correction method is implemented by hardware, the structure of the correction processing section is almost the same as the structure of the correction processing section shown in FIG. 5, with the exception that an input determining section having the same function as the input value determining section 132A is provided instead of the comparator 22 in FIG. 5. The movement amount calculating section 23 is initiated in response to the determination result output from the input determining section. Also, the determination result is used as a selection control signal for the selector 25.

Embodiment 6

In Embodiment 6, input values of input image signals (L signal, *a signal, *b signal) are color-corrected so that the corrected input values are located within an ideal color region. In this embodiment, the local region to be corrected is defined as a rectangular parallelepiped (or a square column). The center of the rectangular parallelepiped (or the square column) is located at the coordinates (Lc, *ac, *bc) of the center of the region to be corrected. In this embodiment, a color correction method is implemented by software. In this case, the processing amount (calculating amount) of the color correction is reduced due to a decrease of the selected range to be corrected compared to the regions to be corrected of the cubes of Embodiments 3 and 4.

The structure of the correction processing section in Embodiment 6 is the same as the structure of the correction processing section in Embodiment 3 as shown in FIGS. 7 and 9, with the exception that in Embodiment 3, an input value determining section 332A instead of the input value calculating section 332 in FIG. 7 is provided to determine whether or not the input values (L, *a, *b) of the input image signals are located within a local region to be corrected (i.e., a rectangular parallelepiped). For example, the rectangular parallelepiped has lengths r1, r1, r on the respective sides, where r1<r.

In Embodiment 6, the color correction method of the present invention is implemented by software. However, the color correction method of the present invention can be implemented by hardware as well. When the color correction method is implemented by hardware, the structure of the correction processing section is almost the same as the structure of the correction processing section shown in FIG. 10, with the exception that three comparators 42A are provided instead of the three comparators 42 in FIG. 10. In this case, one of the comparators 42A performs the comparison using the length r as a reference value, and the remaining comparators 42A perform the comparison using the length r1 as a reference value.

In Embodiments 1 to 6, the region to be corrected is defined as a three-dimensional space having the space coordinates (L, *a, *b). However, the present invention is not limited to this. The region to be corrected may be defined as a two-dimensional plane having any two coordinates among the space coordinates (L, *a, *b). In this case, the operating amount is also reduced.

In Embodiment 5, the region to be corrected is defined as a rotating object obtained by rotating the ellipse around the long axis of the ellipse. In Embodiment 6, the region to be corrected is defined as a rectangular parallelepiped (square pillar). However, the present invention is not limited to these. The region to be corrected may be defined as a column (pillar) or an elliptical pillar.

In Embodiments 3 to 6, the movement amounts become larger equally as the input values of the input image signals are located closer to the coordinates (Lc, *ac, *bc) of the center of the region to be corrected, as shown by a solid line in FIG. 6. However, the present invention is not limited to this. It is possible to use equations other than equations 4 to 6, such that the movement amounts are not substantially changed when the input values of the input image signals are located in the vicinity of the coordinates (Lc, *ac, *bc) of the center of the region to be corrected or in the outer periphery portion of the region to be corrected, and such that the movement amounts are most greatly changed at an intermediate position between the center of the region to be corrected and the outer periphery portion of the region to be corrected, as shown by a broken line in FIG. 6. When the movement amounts are greatly changed, it is preferable to change the movement amounts along the broken line in FIG. 6 rather than the solid line in FIG. 6 in order to reduce an adverse effect on a color region outside the region to be corrected.

Embodiment 7

In Embodiment 7, an example in which the correction processing section of Embodiments 1 to 6 is applied to a camera apparatus will be described.

Figure 12:
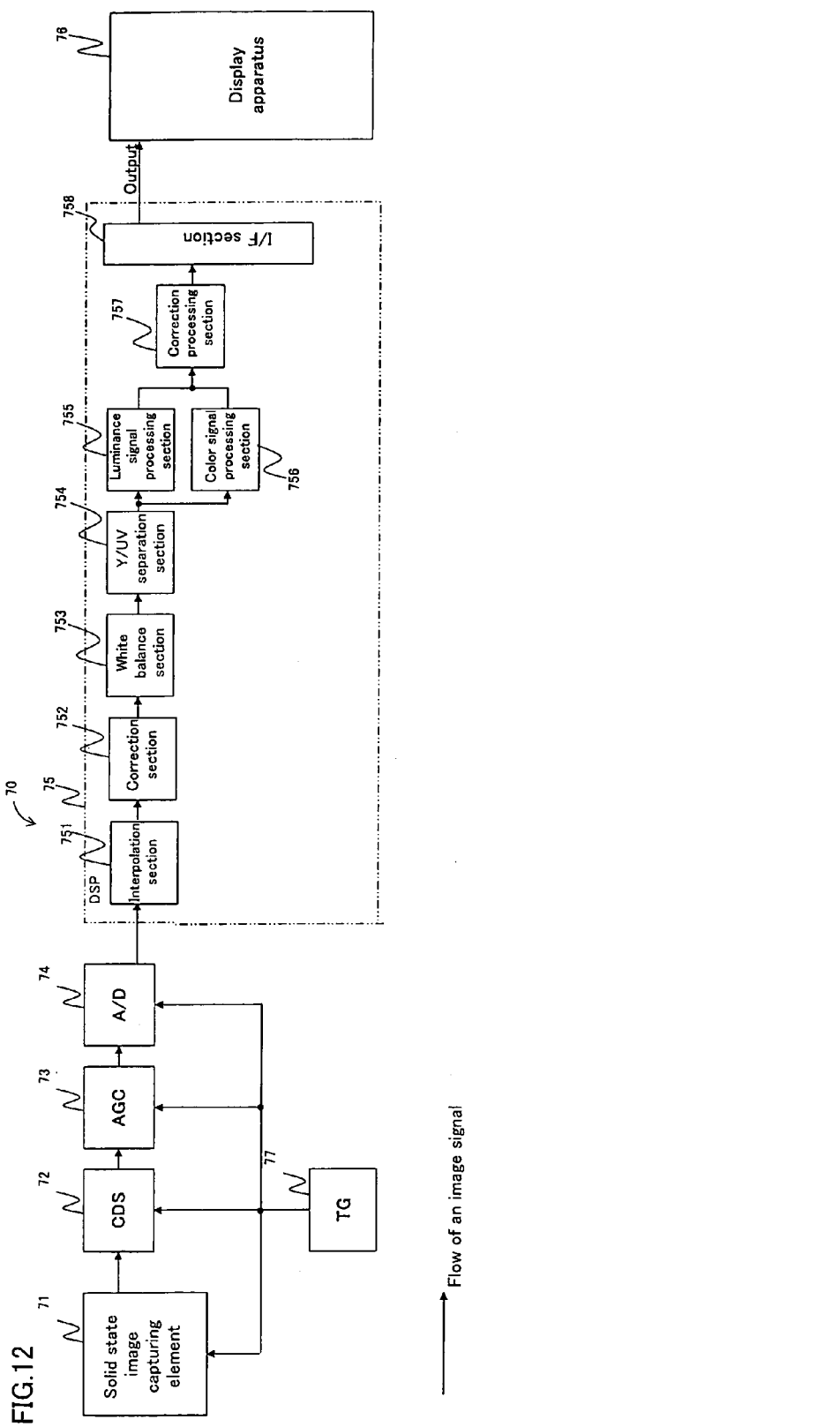
FIG. 12 is a block diagram showing an example of the basic structure of a camera apparatus according to the present invention.

FIG. 12 is a block diagram showing an example of the basic structure of a camera apparatus 70 according to the present invention.

In FIG. 12, the camera apparatus 70 of Embodiment 7 includes a solid state image capturing element 71, a correlating double sampling circuit (CDS) 72, an automatic gain control circuit (AGC) 73, an A/D conversion circuit 74, a digital signal processing circuit (DSP) 75 acting as an image processing apparatus, a display apparatus 76 and a timing generator (TG) 77.

The solid state image capturing element 71 photoelectrically converts the light of a captured subject into an electrified signal. An image capturing apparatus is configured to include solid state image capturing elements 71. The solid state image capturing elements 71 are arranged to conform with the Bayer arrangement of the color filters. The incident light from an optical lens (not shown) is photoelectrically converted into an electrical image signal by the solid state image capturing elements 71.

The CDS 72 determines a black signal reference with a correlation between the analog image signal from the solid state image capturing elements 71 and a black level, and thereafter extracts an image signal.

The AGC 73 amplifies the image signal from the CDS 72 up to a predetermined level.

The A/D conversion circuit 74 converts the analog image signal output from the AGC 73 into a digital image signal.

The DSP 75 performs signal processing on the digital image signal output from the A/D conversion circuit 74 in order to improve the quality of the digital image signal.

An interpolation section 751 converts the Bayer arrangement for color filters such that RGBs are aligned for each pixel, and thereafter, performs an interpolation processing on the image signal.

A γ correction section 752 performs γ conversion processing in accordance with characteristics of a CRT as a signal output section.

A white balance section 753 is a circuit for correcting a shift of the image signals output from the solid state image capturing elements 71 from the white level. The white balance section 753 outputs the digital image signal thus white-adjusted.

A Y/UV separation section 754 separates the image signal from the white balance section 753 into a luminance signal L and a* signal and b* signal of color signals.

A luminance signal processing section 755 performs signal processing depending on the intensity (luminance) of light. The luminance signal processing section 755 performs luminance signal processing (e.g., edge emphasizing processing) on the luminance signal L from the Y/UV separation section 754 so as to output the resultant signal to an image processing section 757.

A color signal processing section 756 performs signal processing in response to a color signal. The color signal processing section 756 performs a phase change, amplification, etc., of the color signal from the Y/UV separation section 754 so as to output the resultant signal to the image processing section 757.

The image processing section 757 shifts the coordinates of the center of the region to be corrected (e.g., a skin color region) into an ideal color region to be targeted, as well as the region to be corrected. In the ideal color region, a human can observe an image vividly.

As a result, an accurate image having a color region realizing a suitable color-tone can be obtained without altering a surrounding color region outside the region to be corrected.

In this case, the movement amounts (changing amounts) are set in accordance with a distance between the center of the region to be corrected and the input values of the input image signals. Specifically, the movement amounts (changing amounts) are set, such that they become smaller as the input values approach from the center of the region to be corrected to the outer peripheral portion of the region to be corrected, and such that they are "0"s when the input values are located at the outer peripheral portion of the region to be corrected.

Thus, it is possible to provide any influence to other color regions which are outside of the region to be corrected. It is also possible to establish an appropriate color reproduction on a selected color region. It is also possible not to produce any discrete color spaces.

An IF section 758 converts the signal into a signal having a suitable form for a final apparatus (i.e., a display apparatus or an image storing apparatus). The IF section 758 outputs the analog or digital signal suitable for the final apparatus.

The display apparatus 76 is, for example, a liquid crystal display or a CRT (Cathode Ray Tube).

The TG (Timing Generator) 77 generates driving control waveforms (timing control signals) for the solid state image capturing elements 71, the CDS 72, the AGC 73 and the A/D conversion circuit 74.

Figure 13:
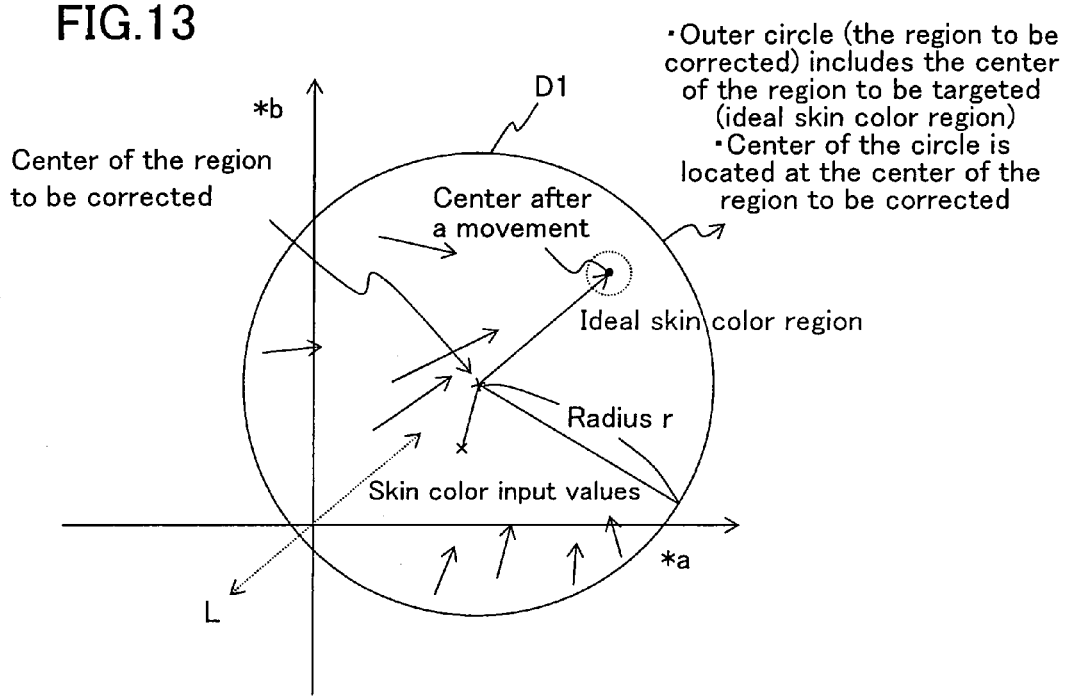
FIG. 13 is a color correction space showing an (L*a*b) space which is a coordinate system for the input values to be input to the image processing section of FIG. 12 and the (L*a*b) space after a color correction.

FIG. 13 shows an example of a color correction space. FIG. 13 shows an (L*a*b) space before color correction and an (L*a*b) space after color correction. The (L*a*b) space has a coordinate system. The input values input to the image processing section 757 shown in FIG. 12 are located on the coordinate system. Hereinafter, in order to simplify the description, a two-dimensional space (*a*b) will be described.

The maximum amount of space represented by the solid state image capturing apparatus is a maximum amount of space which can be represented by the solid state image capturing elements 71 shown in FIG. 12. The maximum amount of space represented by the display apparatus is a maximum amount of space which can be represented by the display apparatus 76. Usually, the maximum amount of space which can be represented by the solid state image capturing elements 71 is determined by the effect of spectroscopic characteristics, and the maximum amount of space which can be represented by the display apparatus 76 is determined by the effect of display characteristics.

Herein, a correction of a color space of skin color and a correction of the maximum value of color blue will be described. The signal representing skin color or color blue is processed by the solid state image capturing elements 71.

First, an example of the correction of the skin color will be described.

Figure 14:
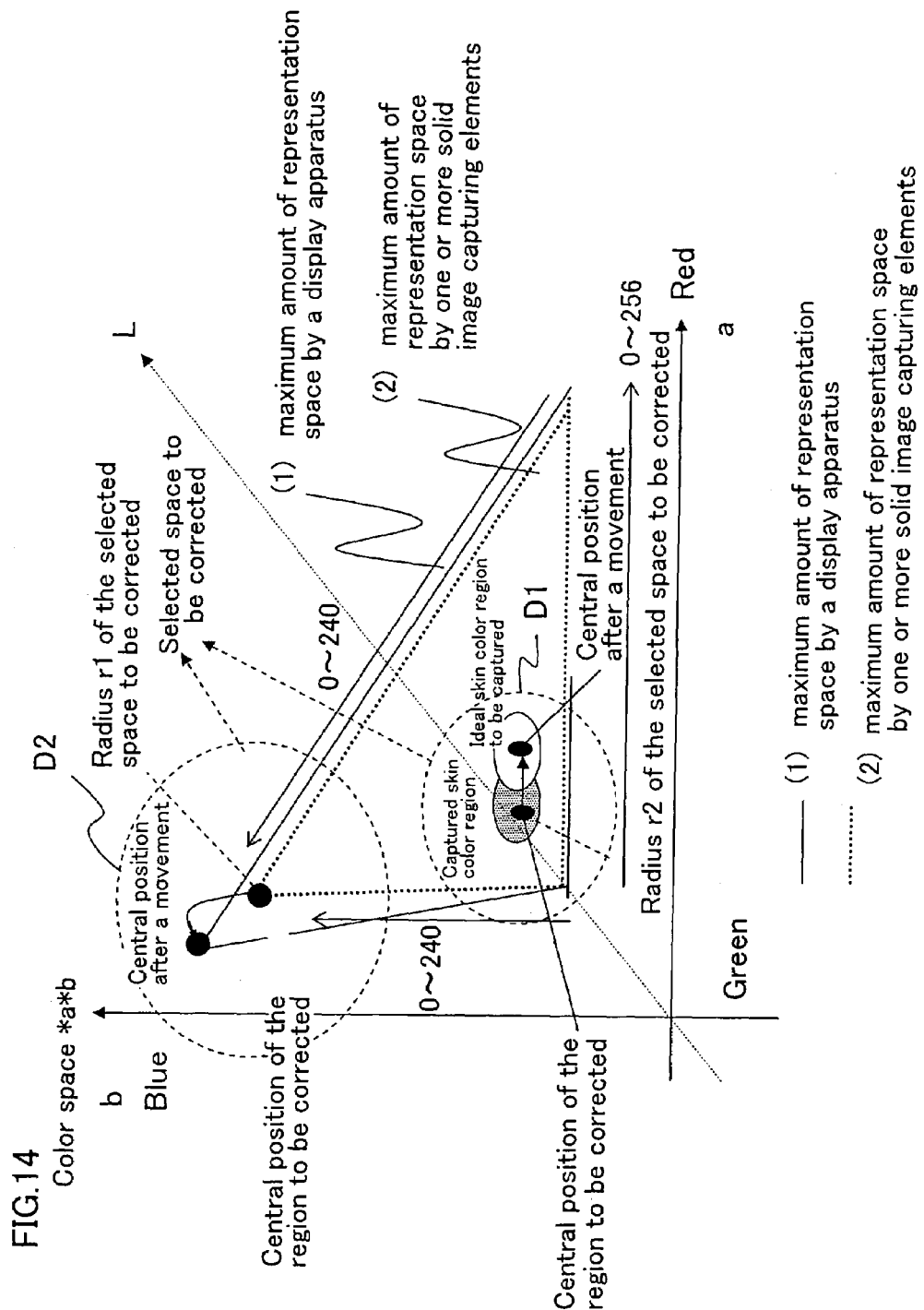
FIG. 14 is a diagram of a color correction space which is to be color-corrected by the image processing section shown in FIG. 12.
Figure 15:
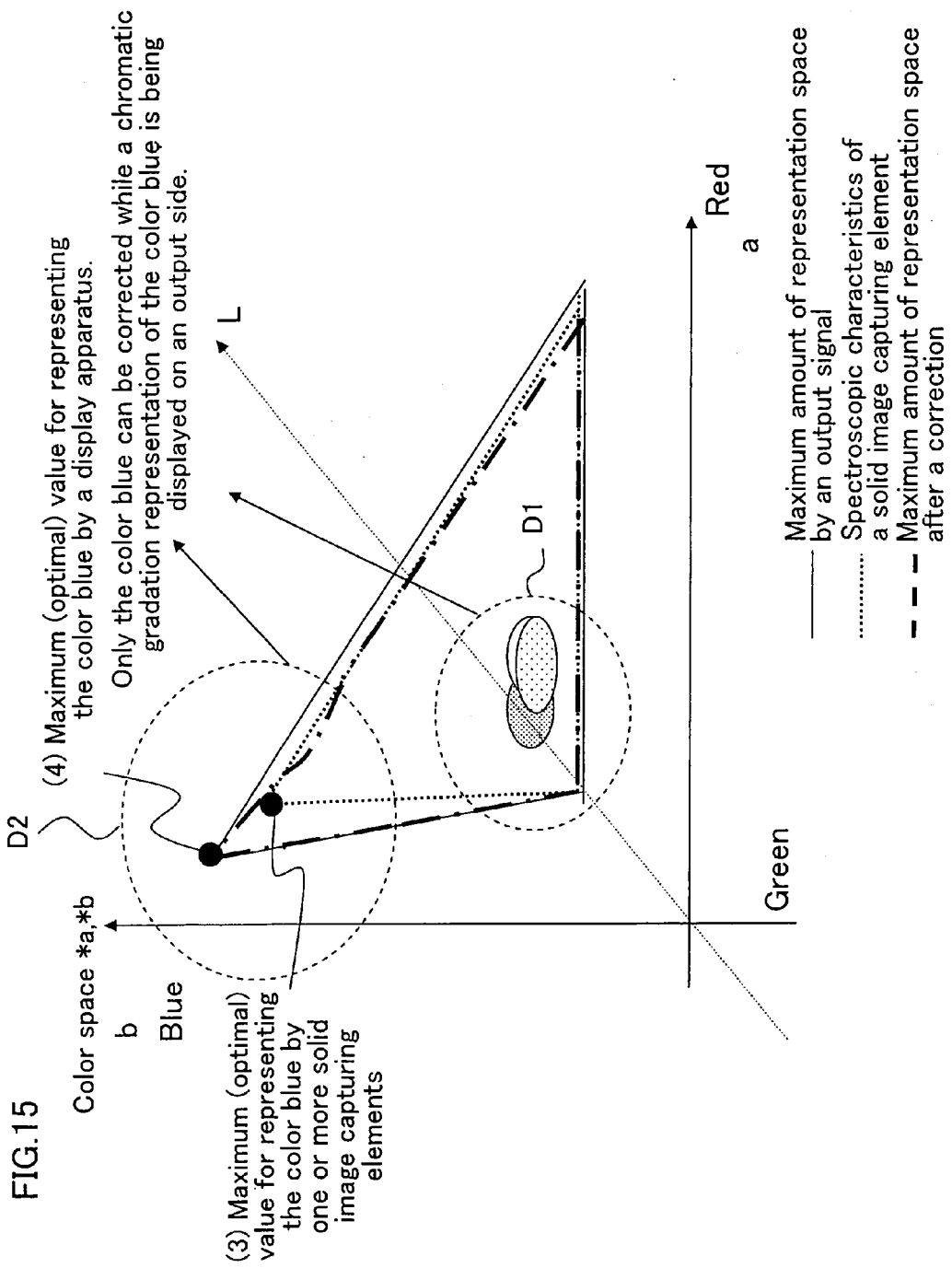
FIG. 15 is a diagram of a color correction space which has been color-corrected by the image processing section shown in FIG. 12.
Figure 16:
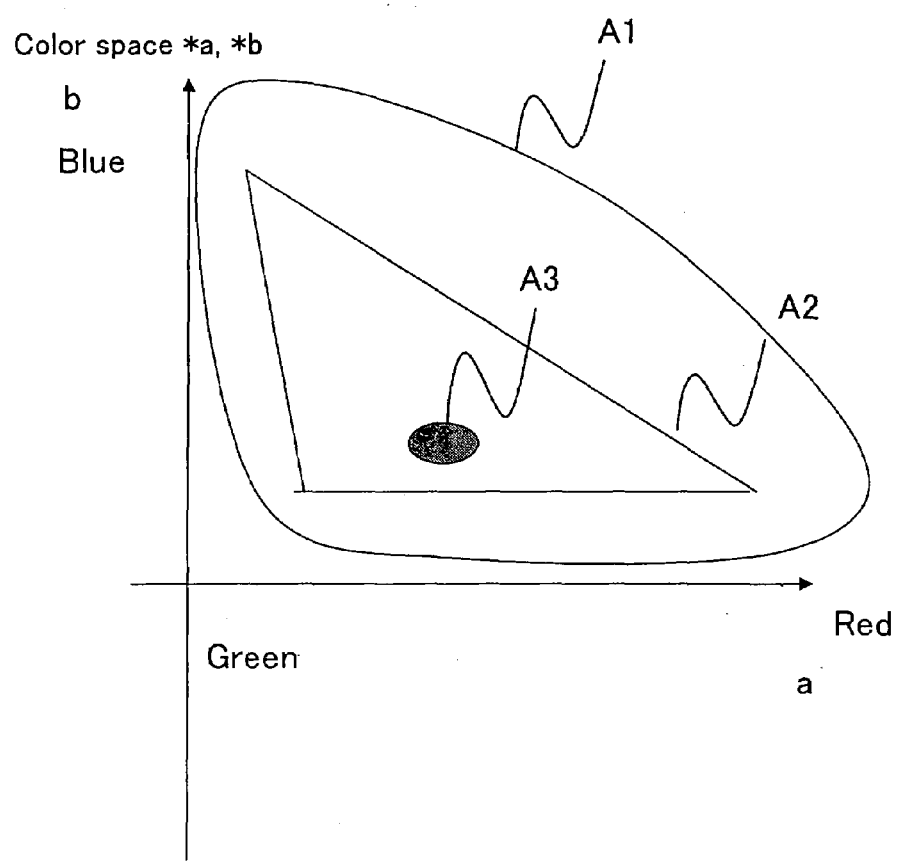
FIG. 16 is a diagram showing a position of a skin color in a color space.
Figure 17:
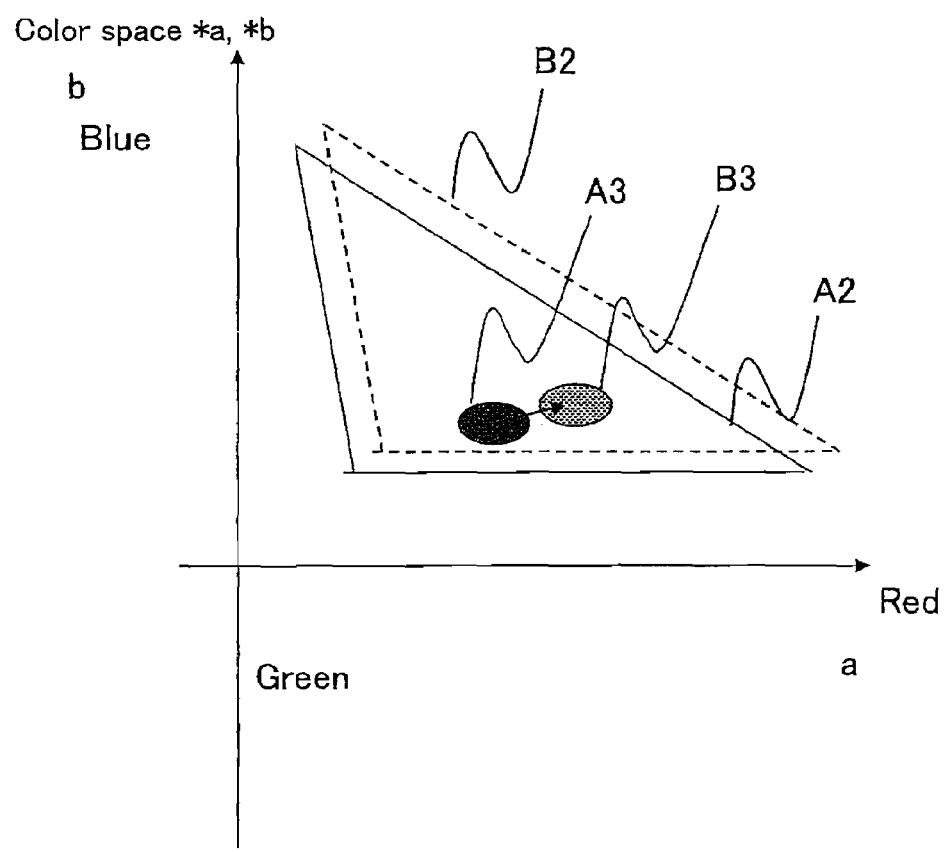
FIG. 17 is a diagram showing, as a conventional color correction method, a color space after the skin color region is moved by adding a certain values to the current values.
Figure 18:
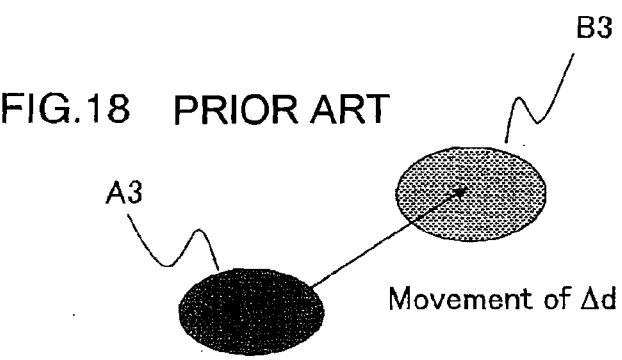
FIG. 18 is a diagram showing details of moving the skin color region of FIG. 17 by adding a certain values to the current values.
Figure 19:
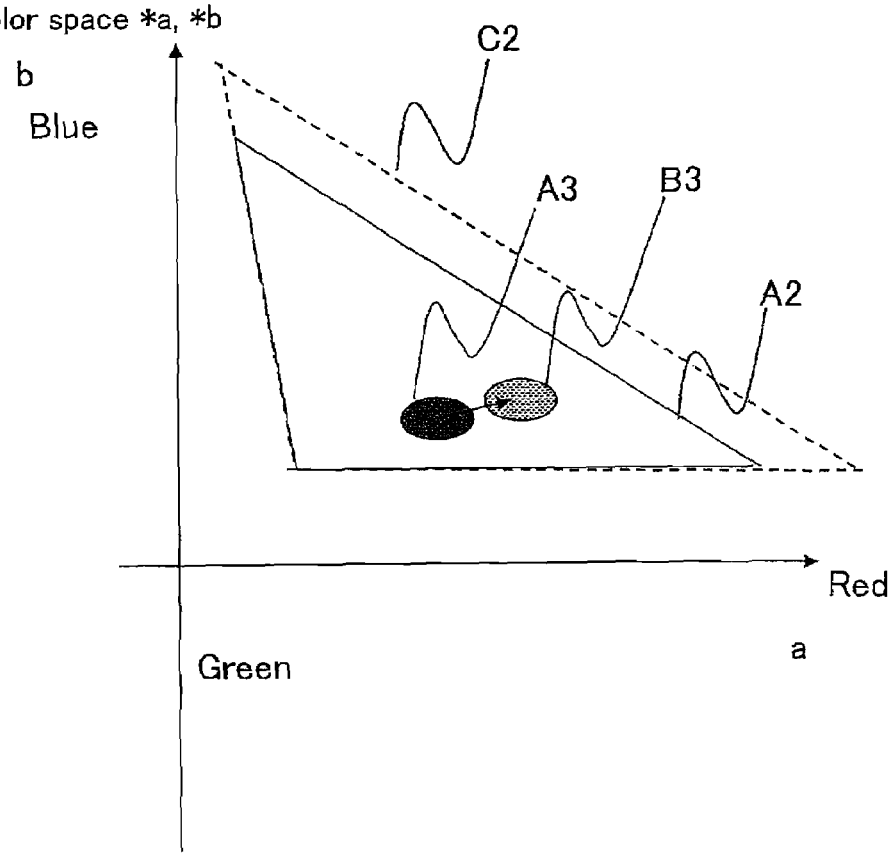
FIG. 19 is a diagram showing a color space after the skin color region is moved by multiplying the current values by an appropriate factor, which is performed as a conventional color correcting method.
Figure 20:
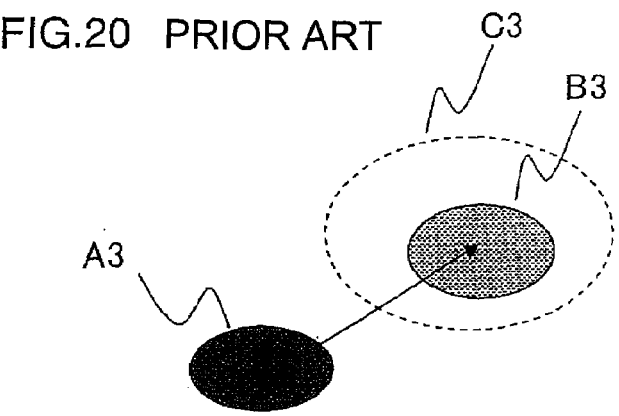
FIG. 20 is a diagram showing details of moving the skin color region of FIG. 19 by integration.

Portion (3) of FIG. 15 shows an image signal space for a skin color output from the solid state image capturing elements. FIG. 14 shows an ideal skin color space determined by a user in view of the characteristics of the solid state image capturing elements. The color correction according to the present invention is performed by the correction processing section 757 in Embodiment 7.

First, the center of the skin color region of the solid state image capturing elements shown in FIG. 14 (i.e., the center of the region to be corrected) is set to be a center of circle D1 which is defined as a region to be corrected.

Next, the center of the ideal skin color space is set to be a center after a correcting movement shown in FIG. 14. The circle D1 has radius r1. The radius r1 is set such that the circle D1 includes the ideal skin color region. The center of the circle D1 is located at the center of the skin color region of the solid state image capturing elements shown in portion (2) of FIG. 14.

By moving only the region having the radius r1 and the center of the skin color region to an ideal space as illustrated in FIG. 14 according to this method, a suitable skin color can be output without affecting the color balance of other regions outside of the circle D1 which is defined as the region to be corrected.

Since the difference may exist in size between the maximum amount of representation space (2) that is output from the solid state image capturing elements and the maximum amount of representation space (1) that is output from the display apparatus as illustrated in this set example, for example, a region which is defined as the color "blue" by the display apparatus may be not output from the solid state image capturing elements. Thus, sometimes, the color "blue" is not vividly represented. In FIG. 15, the maximum (optimal) value for representing the color "blue" (3) by the solid state image capturing elements is required to move to the maximum (optimal) value for representing the color "blue" (4) by the display apparatus.

The maximum (optimal) value for representing the color "blue" (3) by the solid state image capturing elements shown in FIG. 15 is set to be the center of the region to be corrected. The maximum (optimal) value for representing the color "blue" (4) by the display apparatus as shown in FIG. 15 is set to be a center of the region after a correcting movement. A color correction is performed on the region to be corrected. In this case, the region to be corrected is defined as circle D2 having radius r2. The radius r2 of the circle D2 is set such that the circle D2 includes the maximum (optimal) value representing the color "blue" (4) by the display apparatus. The center of the circle D2 is located at the center of the maximum (optimal) value for representing the color "blue" (3) by the image capturing elements.

According to Embodiment 7, a preferable image applicable to a display apparatus or an image capturing apparatus can be obtained using an extremely simple circuit (hardware) or software.

As described above, in Embodiments 1 to 7, when the center of a predetermined color region (i.e., the coordinates of the center of the region to be corrected) is moved to the center of the ideal color region (i.e., the coordinates of the center of the region after the correcting movement) for color correction processing, the color correction processing is performed within the selected region to be corrected, such that the movement amounts indicating how much the input values should be moved for the purpose of color correction become smaller as the distance between the input values and the coordinates of the center of the region to be corrected becomes larger. The color correction processing is based on the input values of the input image signals (L signal, *a signal, *b signal), conditional data (e.g., radius r of a sphere, length r of a cube) which defines a local region to be corrected, the coordinates (Lc, *ac, *bc) of the center of the region to be corrected and the coordinates (Lm, *am, *bm) of the center of an ideal color region after a correcting movement. In this manner, a local color correction is performed by using a continuous non-linear conversion. Thus, the region after the correcting movement is not clipped due to its protrusion from the region represented by the apparatus, and the increase of the processing amount (calculating amount) is suppressed without altering a surrounding color region outside the color region to be corrected.

In Embodiment 7, a region to be corrected is represented by three-dimensional space coordinates (L, *a, *b) and the Y/UV separation section 754 is configured to separate an image signal from the white balance section 753 into a luminance signal L and *a signal and *b signal of color signals. However, the present invention is not limited to these. The region to be corrected can be three-dimensional space coordinates (Y, U, V) and the Y/UV separation section can be configured to separate the image signal from the white balance section 753 into a luminance signal Y and a U signal and a V signal of color difference signals. In Embodiments 1 to 7, a region to be corrected is represented by three-dimensional space coordinates (L, *a, *b). However, the present invention is not limited to this. The region to be corrected can be three-dimensional space coordinates (Y, U, V). Further, the luminance of the input values can be corrected when the color of the input signals is corrected, although it is not specifically described in Embodiments 1 to 7 above.

Hereinafter, a case where a luminance correction is performed as well as the color correction will be described in Embodiments 8 and 9 below. These are similar to Embodiments 1 and 2. In this case, the region to be corrected is represented by a three-dimensional space coordinates (Y, U, V).

Embodiment 8

In Embodiment 8, input values of input image signals (Y signal, U signal, V signal) are color-corrected so that the corrected input values are located within a color region including an ideal luminance. In this embodiment, the local region to be corrected is defined as a sphere having a center and a radius r. The center of the sphere is located at the coordinates (Yc, Uc, Vc) of the center of the region to be corrected. In this embodiment, a color correction method is implemented by software.

In FIG. 2, a correction processing section 10A of Embodiment 8 includes a ROM 11A, a RAM 12A and a CPU 13A (Central Processing Unit).

The ROM 11A functions as a first storage section for storing a correction processing program and various data for performing the correction processing.

The RAM 12A functions as a second storage section functioning as a work memory. When the correction processing section 10A is initiated, the correction processing program and the various data are input to the RAM 12A and are stored therein.

The CPU 13A functions as a control section for performing a color correction processing, based on the input values of the input image signals (Y signal, U signal, V signal), conditional data (e.g. radius r) which defines a local region to be corrected, the coordinates (Yc, Uc, Vc) of the center of the region to be corrected and the coordinates (Ym, Um, Vm) of the center of an ideal color region to be targeted. The color correction processing is performed by moving the center of a predetermined color region (i.e., the coordinates of the center of the region to be corrected) to the center of an ideal color region (i.e., the coordinates of the center of ideal region to be targeted). The color correction processing is performed within the region to be corrected (e.g. a sphere having a radius r), such that the movement amounts indicating how much the input values should be moved for the purpose of color correction become smaller as the distance between the input values and the coordinates of the center of the region to be corrected becomes larger.

The correction processing program can be recorded on a computer readable recording medium. Various type of memories (e.g. IC memory, optical disc (CD), magnetic disc (FD) or hard disc) are used as the ROM 11A or the RAM 12A.

The CPU 13A includes a distance calculating section 131A, an input value determining section 132B, a movement amount calculating section 133A and a color correction section 134A.

The distance calculating section 131A calculates the distance between the input values of the input image signals and the coordinates (Yc, Uc, Vc) of the center of the region to be corrected.

The input value determining section 132B determines whether or not the distance between the input values of the input image signals and the coordinates (Yc, Uc, Vc) of the center of the region to be corrected is smaller than or equal to radius r.

The movement amount calculating section 133A calculates movement distances (movement amounts) indicating how much the input values should be moved for the purpose of color correction.

The color correction section 134A corrects the luminance and/or the color of the input values by moving the input values of the input image signals by the calculated movement distances (movement amounts).

The operation of the correction processing section 10A will be described below.

FIG. 21 is a diagram showing center A of a region to be corrected, center B of an ideal color region, and sphere D having a center and radius r, in three-dimensions. The center of the sphere D is located at the center A of the region to be corrected. FIG. 4 is a flowchart showing a procedure of the correction processing performed by the correction processing section 10A shown in FIG. 2.

As shown in FIGS. 21 and 4, in step S1, the coordinates (Yc, Uc, Vc) of the center of the region to be corrected and radius r of the sphere D are given to the correction processing section 10A. Further, the coordinates (Ym, Um, Vm) of the center of the ideal color region to be targeted are given to the correction processing section 10A. Herein, the coordinates (Ym, Um, Vm) are located within the region to be corrected (i.e., within the sphere D having the center at the coordinates (Yc, Uc, Vc) and the radius r).

The distance between the coordinates (Yc, Uc, Vc) of the center of the region to be corrected and the coordinates (Ym, Um, Vm) of the center of the ideal color region to be targeted is calculated as distance components for respective components of the Y, U, V space. The distance components are denoted as (DisY, DisU, DisV). The distance components are predetermined. The distance components (DisY, DisU, DisV) are defined as maximum movement amounts of the input image signals in the color correction processing of the present invention.

$$DisY = |Yc - Ym| \qquad \text{equation 11}$$

$$DisU = |Uc - Um| \qquad \text{equation 12}$$

$$DisV = |Vc - Vm| \qquad \text{equation 13}$$

Next, in step S2, the distance between the input values of the input image signals and the coordinates (Yc, Uc, Vc) of the center of the region to be corrected is calculated.

Herein, the input values of the input image signals in a unit of one pixel are denoted as [Yx, Ux, Vx]. The distance between the input values of the input image signals and the coordinates (Yc, Uc, Vc) of the center of the region to be corrected is calculated for each pixel. The distance is denoted DisIn. The distance DisIn is calculated by the following equation.

$$DisIn = (|Yc - Yx|^2 + |Uc - Ux|^2 + |Vc - Vx|^2)^{(1/2)}$$

By referring to the distance DisIn, it is recognized, for each pixel, how the input values of the input image signals are far from the coordinates (Yc, Uc, Vc) of the center of the region to be corrected.

In step S3, it is determined whether or not the distance DisIn between the input values and the coordinates (Yc, Uc, Vc) of the center of the region to be corrected is smaller than or equal to radius r.

If the determination result is "Yes" in step S3, then step S4 (movement amounts calculating process) and step S5 (color correction process) are performed.

In step S4, the movement distances (movement amounts) indicating how much the input values should be moved for the purpose of color correction are calculated. In step S5, the luminance and/or color of the input values [Yx, Ux, Vx] of the input image signals are corrected such that the corrected input values [Yy, Uy, Vy] are within the ideal color region, by moving the input values [Yx, Ux, Vx] by the movement distances calculated in step S4. An example of a software algorithm for performing luminance/color correction is shown in FIG. 21.

The corrected input values [Yy, Uy, Vy] can be obtained from the input values [Yx, Ux, Vx] by the following equations. This is the result derived by moving the coordinates (Yc, Uc, Vc) of the center of the region to be corrected to the coordinates (Ym, Um, Vm) of the center of the ideal color region to be targeted.

$$Yy = Yx \pm ((1 - DisIn/r) \times DisY) \qquad \text{equation 14}$$

$$Uy = Ux \pm ((1 - DisIn/r) \times DisU) \qquad \text{equation 15}$$

$$Vy = Vx \pm ((1 - DisIn/r) \times DisV) \qquad \text{equation 16}$$

If the determination result is "No" in step S3, then step S4 (movement amounts calculating process) and step S5 (color correction process) are not performed. In this case, the corrected input values [Yy, Uy, Vy] can be obtained from the input values [Yx, Ux, Vx] by the following equations.

$$Yy = Yx \qquad \text{equation 17}$$

$$Uy = Ux \qquad \text{equation 18}$$

$$Vy = Vx \qquad \text{equation 19}$$

As described above, according to Embodiment 8 (which is similar to Embodiment 1), the equations 14-16 indicate that the movement distances (movement amounts) for color correction become larger as the input values of the input image signals are located closer to the coordinates (Yc, Uc, Vc) of the center of the region to be corrected, and that the movement distances (movement amounts) for color correction become smaller as the input values of the image signals are located further from the coordinates (Yc, Uc, Vc) of the center of the region to be corrected. As a result, it is possible to prevent an increase of the discreteness between the inside and the outside of the region to be corrected (e.g., the sphere D having radius r). It is possible to move the input values by the maximum movement distance when the input values are located at the coordinates (Yc, Uc, Vc) of the center of the region to be corrected. Therefore, it is also possible to realize an ideal color representation for a predetermined color region while keeping the image continuity between the inside and the outside of the sphere D.

Embodiment 9

In Embodiment 9, input values of input image signals (Y signal, U signal, V signal) are color-corrected so that the corrected input values are located within an ideal color region. In this embodiment, the local region to be corrected is defined as a sphere having a center and a radius r. The center of the sphere is located at the coordinates (Yc, Uc, Vc) of the center of the region to be corrected. In this embodiment, a color correction method is implemented by hardware.

FIG. 5 is a block diagram showing an example of the basic structure of the correction processing section 20A in Embodiment 9 (FIG. 1).

In FIG. 5, the correction processing section 20A of Embodiment 9 includes a distance calculating section 21A, a comparator 22, a movement amount calculating section 23A, a color correction section 24A and a selector 25.

The distance calculating section 21A calculates a distance between input values (Y, U, V) of the input image signals and the coordinates (Yc, Uc, Vc) of the center of the region to be corrected as a voltage value for comparison.

The comparator 22 functions as a comparing section (input value determining section) to determine whether or not the distance between the input values and the coordinates (Yc, Uc, Vc) of the center of the region to be corrected is smaller than or equal to the radius r. Specifically, the comparator 22 compares (1) a voltage value corresponding to the distance between the input values of the input image signals and the coordinates (Yc, Uc, Vc) of the center of the region to be corrected with (2) a voltage value corresponding to the radius r as conditional data which defines the sphere D of the region to be corrected, and outputs the comparison result.

The movement amount calculating section 23A calculates movement distances (movement amounts) indicating how much the input values should be moved for the purpose of color correction. The movement calculating section 23A is initiated when the comparison result is a voltage at a high level. The movement calculating section 23A is not initiated when the comparison result is a voltage at a low level.

The color correction section 24A corrects the luminance and/or the color of the input values by moving the input values of the input image signals by the calculated movement distances (movement amounts).

The selector 25 functions as a signal selection section for selecting one of the color correction outputs from the color correction section 24A and the input values of the input image signals, in accordance with the determination result output from the comparator 22. The selector 25 is controlled to select the color correction outputs from the color correction section 24A when the distance between the input values and the coordinates (Yc, Uc, Vc) of the center of the region to be corrected is smaller than or equal to the radius r. The selector 25 is controlled to select the input values when the distance between the input values and the coordinates (Yc, Uc, Vc) of the center of the region to be corrected is greater than the radius r.

The operation of the correction processing section 20A will be described.

The input values [Yx, Ux, Vx] of the input image signals and the coordinates (Yc, Uc, Vc) of the center of the region to be corrected are input to the distance calculating section 21A. The distance calculating section 21A calculates a distance between the input values of the input image signals and the coordinates (Yc, Uc, Vc) of the center of the region to be corrected (i.e., the distance DisIn described above).

Next, an input voltage value corresponding to the distance DisIn and a reference voltage value corresponding to the radius r are input to the comparator 22. The comparator 22 compares the distance DisIn with the radius r. When the distance DisIn is larger than the radius r, the comparator 22 outputs a voltage at low level as a signal indicating the comparison result at its output end. When the distance DisIn is smaller than or equal to the radius r (i.e., when the input values [Yx, Ux, Vx] are located within the region to be corrected), the comparator 22 outputs a voltage at high level as a signal indicating the comparison result at its output end.

A signal indicating the comparison result from the comparator 22 is input to the movement amount calculating section 23A. A signal corresponding to the radius r and a signal corresponding to the maximum distance of the movement amount are further input to the movement amount calculating section 23A. The maximum distance of the movement amount is a distance between the coordinates (Yc, Uc, Vc) of the center of the region to be corrected and the coordinates (Ym, Um, Vm) of the center of the ideal color region to be targeted. The maximum distance of the movement amount is predetermined. The movement amount calculating section 23A is initiated only when the comparison result signal is a voltage at a high level. Once the movement amount calculating section 23A is initiated, it calculates movement distances (movement amounts) indicating how much the input values [Yx, Ux, Vx] of the input image signals should be moved for the purpose of color correction. The equations 14-16 described above are used for this calculation.

The movement distances (movement amounts) from the movement amount calculating section 23A and the input values [Yx, Ux, Vx] of the input image signals are input to the color correction section 24A. The color correction section 24A adds the movement distances (movement amounts) to the input values [Yx, Ux, Vx] of the input image signals, respectively, so as to correct the luminance and/or the color of the input values.

The selector 25 selects the color correction outputs from the color correction section 24A when the distance between the input values of the input image signals and the coordinates (Yc, Uc, Vc) of the center of the region to be corrected is smaller than or equal to the radius r. The selector 25 outputs the input values of the input image signals in their original form without performing any color correction on the input values when the distance is larger than the radius r. In this case, a hardware algorithm shown in FIG. 22 can be used.

As described above, according to Embodiment 9, the movement distances (movement amounts) for color correction become larger as the input values of the input image signals are located closer to the coordinates (Yc, Uc, Vc) of the center of the region to be corrected. The movement distances (movement amounts) for color correction become smaller as the input values of the input image signals are located further from the coordinates (Yc, Uc, Vc) of the center of the region to be corrected. The movement distances (movement amounts) for color correction are set to "0"s when the input values of the input image signals are located at the outer peripheral portion of the region to be corrected (e.g., the sphere D). As a result, it is possible to prevent an increase of the discreteness between the inside and the outside of the region to be corrected (e.g., the sphere D having radius r). It is possible to move the input values by the maximum movement distance when the input values are located at the coordinates (Yc, Uc, Vc) of the center of the region to be corrected. Therefore, it is also possible to realize an ideal color representation for a predetermined color region while keeping the image continuity between the inside and the outside of the sphere D.

In Embodiments 1 to 9, a color correction including a luminance correction is required to be performed in order to obtain an ideal color representation. For example, only the color correction for (*a, *b) or (U, V) results in a representation of skin color which appears darker. However, a transparent dark skin color is preferred as an ideal color representation. In order to obtain such a vivid skin color, a correction for luminance component is required in addition to a correction for color components. The correction including luminance component L or Y for (L, *a, *b) or (Y, U, V) is required.

Figure 23:
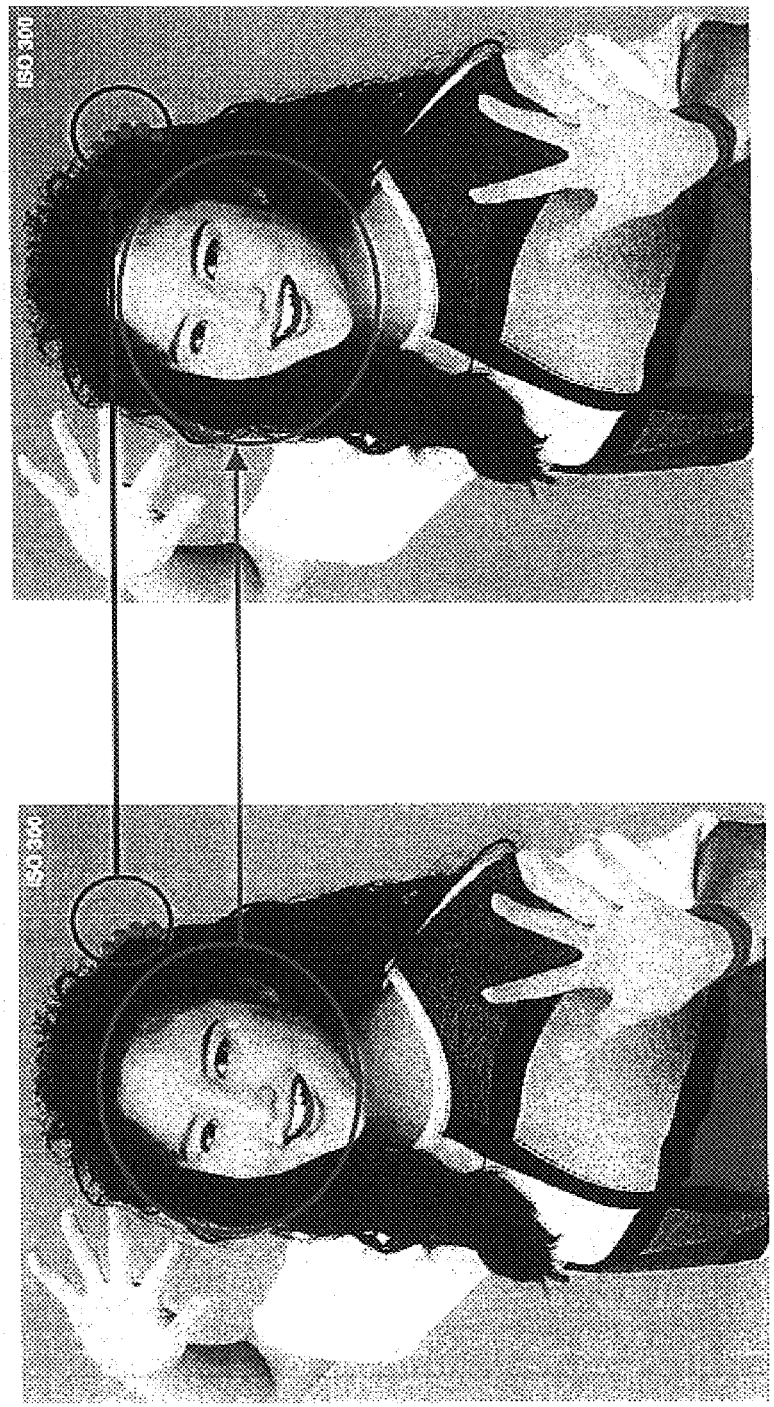
FIG. 23 is a diagram showing states before and after the skin color correction according to the present invention.
Figure 24:
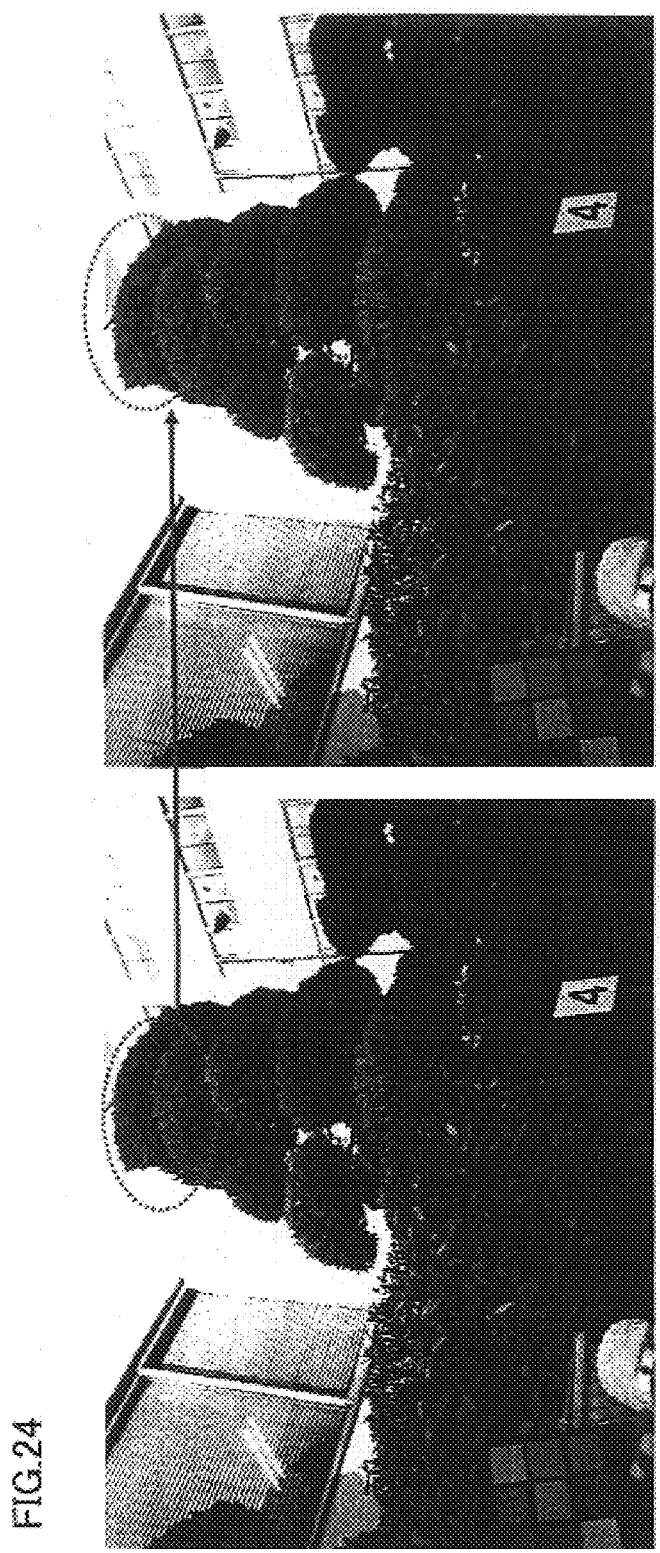
FIG. 24 is a diagram showing states before and after the green color correction according to the present invention.
Figure 25:
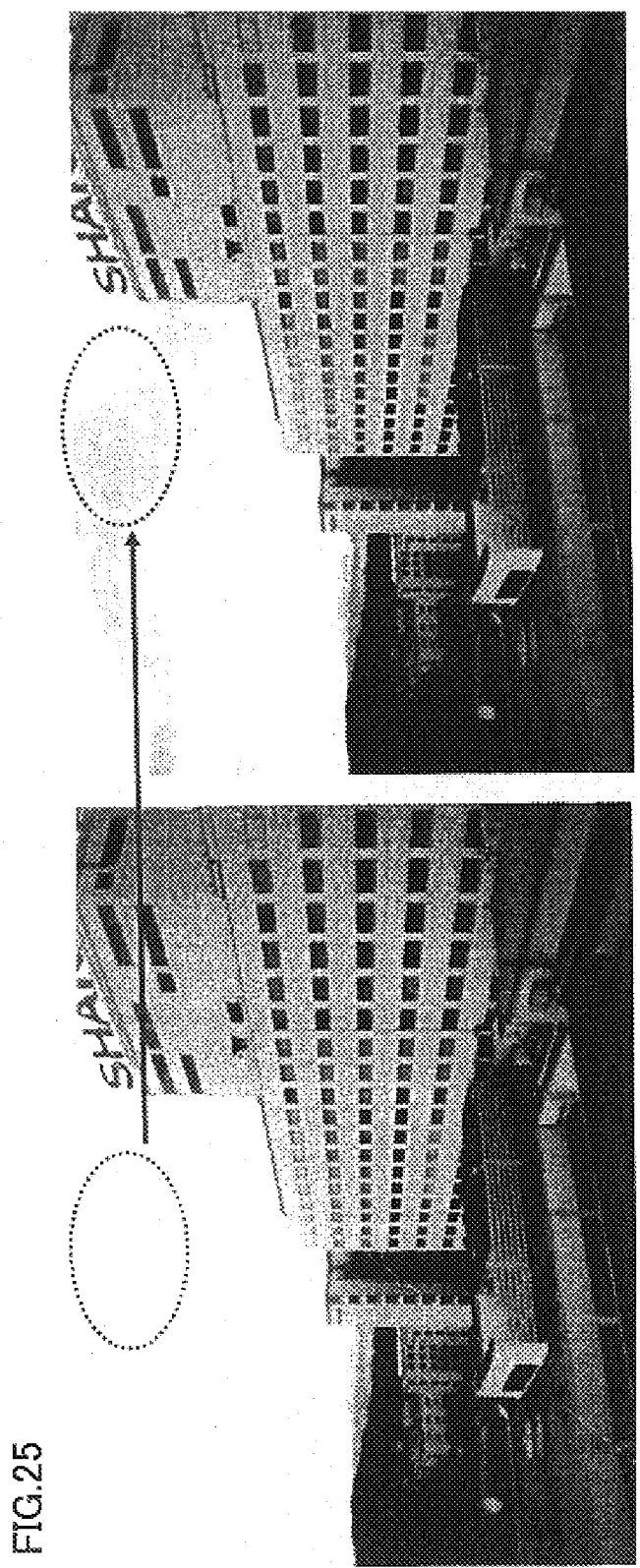
FIG. 25 is a diagram showing states before and after the sky blue color correction according to the present invention.

FIG. 23 shows an example in which a color correction including a luminance correction is performed so as to obtain a transparent dark skin color as an ideal color representation. FIG. 24 shows an example in which a color correction including a luminance correction is performed to obtain a green color which would be observed in trees as an ideal color representation. FIG. 25 shows an example in which a color correction including a luminance correction is performed to obtain a blue color (sky blue color) which would be observed in the sky as an ideal color representation. As can be seen from FIGS. 23 to 25, the skin color, the green color and the sky blue color are respectively represented as ideal color representations in vibrant color.

In Embodiments 8 and 9, as shown by a solid line of FIG. 6, the changing amount of the movement amount is set to be equal (same) between the coordinates (Yc, Uc, Vc) of the center of the region to be corrected and the outer peripheral border of the region to be corrected (e.g. the sphere D). The movement amount is calculated from the equation (1−(the distance between the input values and the center of the region to be corrected)/(the radius of the sphere))×(a maximum distance of the movement amounts).

As described above, the present invention is exemplified by the use of its preferred embodiments. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

The present invention is useful to provide: an image processing apparatus for performing color correction processing on input values of input image signals in a color coordinate system so that a predetermined color region (e.g., skin color region) is shifted to an ideal color region; a camera apparatus using the image processing apparatus; an image output apparatus (e.g., a liquid crystal display (LCD) or a printer) using the image processing apparatus; an image processing method using the image processing apparatus; a color correction processing program for making a computer execute the image processing method; and a computer readable recording medium on which the color correction processing program is recorded. In these fields, according to the present invention, a local color correction is performed by using a continuous non-linear conversion. Thus, the region after the correcting movement is not clipped due to its protrusion from the region represented by the apparatus, and the increase of the processing amount (calculating amount) is suppressed without altering a surrounding color region outside the color region to be corrected.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing apparatus for performing color correction on input values of input signals in a predetermined region to be corrected in a color coordinate system, comprising:
   a movement amount calculating section for calculating movement amounts indicating how much the input values should be moved, in accordance with a voltage corresponding to a distance between the input values and the center of the region to be corrected; and
   a color correction section coupled to the movement amount calculating section, for performing color correction on the input values, by moving the input values based on the calculated-movement amounts,
   wherein the movement amount calculating section calculates the movement amounts such that the movement amounts become smaller as the distance between the input values and the center of the region to be corrected becomes larger, and
   wherein the movement amount calculating section calculates the movement amounts in accordance with an equation having a distribution with a kurtosis greater than that of the distribution defined by the equation: (1−(the distance between the input values and the center of the region to be corrected)/(conditional data which defines the region to be corrected))×(a maximum distance of the movement amounts).

2. An image processing apparatus according to claim 1, wherein the movement amount calculating section calculates the movement amounts such that the movement amounts become close to "0" as the input values approach an outer peripheral boarder of the region to be corrected.

3. An image processing apparatus according to claim 1, wherein the movement amount calculating section calculates the movement amounts such that the movement amounts become "0" when the input values are located at an outer peripheral boarder of the region to be corrected.

4. An image processing apparatus according to claim 1, wherein changing amounts of the movement amounts are set to be equal between the center of the region to be corrected and an outer peripheral border of the region to be corrected.

5. An image processing apparatus according to claim 1, wherein the maximum distance of the movement amounts is a distance between the center of the region to be corrected and the center of an ideal color region.

6. An image processing apparatus according to claim 1, wherein the movement amount calculating section and the color correction section are implemented by hardware.

7. An image processing apparatus according to claim 1, further comprising:
   an input value determining section for determining whether or not the input values are located within the region to be corrected, in accordance with the distance between the input values and the center of the region to be corrected,
   wherein, when it is determined that the input values are located within the region to be corrected, the movement amount calculating section calculates the movement amounts, and the color correction section performs the color correction.

8. An image processing apparatus according to claim 7, further comprising:
   a distance calculating section for calculating a distance between the input values and the center of the region to be corrected.

9. An image processing apparatus according to claim 7, wherein the region to be corrected is defined as a sphere or a circle having a radius r, the center of the sphere or the circle is located at the center of the region to be corrected,
   the input value determining section determines whether or not the distance between the input values and the center of the region to be corrected is smaller than or equal to the radius r.

10. An image processing apparatus according to claim 7, wherein the region to be corrected is defined as a cube or a square having a length r on each side, the center of the cube or the square is located at the center of the region to be corrected, wherein the input value determining section determines whether or not all of the coordinate components of the input values are located within the region to be corrected.

11. An image processing apparatus according to claim 10, wherein the input value determining section determines whether or not all of coordinate components of the input values are located within the region to be corrected, by determining whether or not a relationship of (a distance corresponding to the coordinate component of the input values)<(a distance corresponding to the length r of the sphere or the square) is satisfied for each of the coordinate components of the input values.

12. An image processing apparatus according to claim 10, wherein the input value determining section determines whether or not all of coordinate components of the input values are located within the region to be corrected, by determining whether or not a relationship of (a minimum value of the coordinate value of the sphere or the square)<(the coordinate component of the input values)<(a maximum value of the coordinate value of the sphere or the square) is satisfied for each of the coordinate components of the input values.

13. An image processing apparatus according to claim 1, further comprising:
a distance calculating section for calculating a distance between the input values and the center of the region to be corrected and outputting a voltage value corresponding to the distance;
a comparing section for comparing the voltage value output from the distance calculating section with a voltage value corresponding to conditional data which defines the region to be corrected; and
a signal selection section for selecting one of the color correction outputs from the color correction section and the input values, in accordance with the comparison result by the comparing section.

14. An image processing apparatus according to claim 13, wherein the comparing section includes an AND gate.

15. An image processing apparatus according to claim 13, wherein the movement amount calculating section is initiated in response to the output from the comparing section.

16. An image processing apparatus according to claim 13, wherein the signal selection section selects the color correction outputs from the color correction section when the input values are located within the region to be corrected, and selects the input values when the input values are not located within the region to be corrected.

17. An image processing apparatus according to claim 1, wherein the input image signals are one of L*a*b* signals, RGB signals, CMYK signals, YUV signals and YCbCr signals of color specification systems.

18. An image processing apparatus according to claim 1, wherein the color coordinate system is a color coordinate system for one of L*a*b* signals, RGB signals, CMYK signals, YUV signals and YCbCr signals of color specification systems.

19. An image processing apparatus according to claim 1, wherein the color coordinate system is a coordinate system of a luminance/color space for L*a*b* signals or a coordinate system of a color plane for a*b* signals.

20. An image processing apparatus according to claim 1, wherein the region to be corrected is a local range in two dimensions or three dimensions.

21. An image processing apparatus according to claim 1, wherein the region to be corrected is one of a sphere, a circle, a cube, a square, a rotating object formed by rotating an ellipse around a long axis of the ellipse, an ellipsoid, a column, an ellipsoidal column and a square column.

22. An image processing apparatus according to claim 1, wherein the region to be corrected includes at least one of a skin color region, a blue color region and a green color region.

23. An image processing apparatus according to claim 1, wherein conditional data which defines the region to be corrected is a radius r when the region to be corrected is a sphere or a circle, and conditional data which defines the region to be corrected is a length r on each side when the region to be corrected is a cube or a square.

24. An image processing apparatus according to claim 1, wherein the color correction section performs a luminance correction on the input values in addition to the color correction on the input values.

25. A camera apparatus comprising:
a solid state imaging apparatus including a plurality of pixels; and
an image processing apparatus according to claim 1,
wherein image signals for the respective pixels output from the solid state imaging apparatus are input to the image processing apparatus as the input image signals.

26. An image output apparatus comprising:
an image processing apparatus according to claim 1; and
an output apparatus for outputting image signals subjected to the color correction by the image processing apparatus.

27. An image processing method used in an image processing apparatus for performing color correction on input values of input signals received by the image processing apparatus in a predetermined region to be corrected in a color coordinate system, comprising the steps of:
(a) calculating movement amounts indicating how much the input values should be moved, in accordance with a distance between the input values and the center of the region to be corrected;
(b) performing color correction on the input values, by moving the input values based on the calculated movement amounts; and
(c) outputting for display, by the image processing apparatus, color corrected input values based on the calculated movement amounts,
wherein in the step (a), the movement amounts are calculated, such that the movement amounts become smaller as the distance between the input values and the center of the region to be corrected becomes larger, and
wherein in the step (a) further calculates the movement amount in accordance with an equation having a distribution with a kurtosis greater than that of the distribution defined by the equation: (1−(the distance between the input values and the center of the region to be corrected)/(conditional data which defines the region to be corrected))×(a maximum distance of the movement amounts).

28. An image processing method according to claim 27, wherein in the step (a), the movement amounts are calculated, such that the movement amounts become close to "0" as the input values approach an outer peripheral boarder of the region to be corrected.

29. An image processing method according to claim 27, wherein in the step (a), the movement amounts are calculated, such that the movement amounts become "0" when the input values are located at an outer peripheral boarder of the region to be corrected.

30. An image processing method according to claim 27, further comprising the step of:

determining whether or not the input values are located within the region to be corrected, in accordance with the distance between the input values and the center of the region to be corrected, wherein, when it is determined that the input values are located within the region to be corrected, the movement amounts are calculated in the step (a), and the color correction is performed in the step (b).

31. An image processing method according to claim 30, further comprising the step of:

calculating a distance between the input values and the center of the region to be corrected.

32. An image processing method according to claim 27, wherein in the step (b), a luminance correction on the input values is performed in addition to the color correction on the input values.

33. A color correction processing program stored on a computer readable medium for making a computer execute an image processing method for performing color correction on input values of input signals in a predetermined region to be corrected in a color coordinate system, the image processing method comprising the steps of:

(a) calculating movement amounts indicating how much the input values should be moved, in accordance with a distance between the input values and the center of the region to be corrected;

(b) performing color correction on the input values, by moving the input values based on the calculated movement amounts; and (c) outputting for display, by the image processing apparatus, color corrected input values based on the calculated movement amounts, wherein in the step (a), the movement amounts are calculated, such that the movement amounts become smaller as the distance between the input values and the center of the region to be corrected becomes larger, and wherein in the step (a) further calculates the movement amount in accordance with an equation having a distribution with a kurtosis greater than that of the distribution defined by the equation: (1−(the distance between the input values and the center of the region to be corrected) / (conditional data which defines the region to be corrected))×(a maximum distance of the movement amounts).

* * * * *